(12) United States Patent
Woon et al.

(10) Patent No.: US 7,984,184 B2
(45) Date of Patent: Jul. 19, 2011

(54) METHOD AND APPARATUS FOR MANAGING INFORMATION EXCHANGES BETWEEN APPARATUS ON A WORKSITE

(75) Inventors: Clement Woon, Heerbrugg (CH); Bernhard Marx, Kümbdchen (DE); Peter Stegmaier, Uetikon a/S (CH); Klaus Schneider, Dornbirn (AT)

(73) Assignee: Leica Geosystems AG, Heerbrugg (CH)

( * ) Notice: Subject to any disclaimer, the term of this patent is extended or adjusted under 35 U.S.C. 154(b) by 869 days.

(21) Appl. No.: 10/595,439

(22) PCT Filed: Oct. 21, 2004

(86) PCT No.: PCT/EP2004/011905
§ 371 (c)(1), (2), (4) Date: Aug. 17, 2006

(87) PCT Pub. No.: WO2005/041519
PCT Pub. Date: May 6, 2005

(65) Prior Publication Data
US 2007/0050137 A1    Mar. 1, 2007

(30) Foreign Application Priority Data
Oct. 22, 2003  (EP) .................................. 03024253

(51) Int. Cl.
 *G06F 15/16*   (2006.01)
 *G06F 15/177*  (2006.01)
 *G06F 15/173*  (2006.01)
(52) U.S. Cl. ........ 709/245; 709/218; 709/219; 709/220; 709/221; 709/222; 709/223; 709/224; 709/225; 709/226; 709/227; 709/228; 709/229
(58) Field of Classification Search .......... 709/220–229, 709/245; 455/456.1
See application file for complete search history.

(56) References Cited

U.S. PATENT DOCUMENTS
5,548,756 A * 8/1996 Tantry et al. .......................... 1/1
(Continued)

FOREIGN PATENT DOCUMENTS
CA    2231992    9/1999
(Continued)

OTHER PUBLICATIONS

Kumar et al., 'Critical successes factors for the implementation of integrated automation solutions with PC based control'—Proceedings of the 10th Mediterranean Conference on Control and Automation—MED, 2002, Lisbon, Portugal, p. 1-10.*

(Continued)

*Primary Examiner* — Carl Colin
*Assistant Examiner* — Catherine Thiaw
(74) *Attorney, Agent, or Firm* — Maschoff Gilmore & Israelsen

(57) ABSTRACT

Operations in a worksite (20) are managed by networking at least some items of apparatus (4, 16, 24, 26, 30, 28, 34) which perform tasks in connection with said worksite and which receive and/or send data. The items of apparatus are organized in hierarchical levels according to a determined dependency relationship of the worksite. Communications are made with an electronic data network comprising management means (74, 76, 66, 64) cooperating with a plurality of communications interfaces (42-46), a given item of apparatus having a data link with a specified communications interface. The management means stores a correspondence between each item of apparatus and an address structure reflecting the hierarchical position of that item of apparatus (4, 16, 24, 26, 30, 28, 34) in the determined dependency relationship of the worksite. It uses that correspondence to establish a communications link with a selected item of apparatus, via its communications interface, in response to a call addressed with an address structure reflecting the hierarchical position of that selected item of apparatus.

34 Claims, 11 Drawing Sheets

U.S. PATENT DOCUMENTS

| | | | | | |
|---|---|---|---|---|---|
| 5,724,512 | A | * | 3/1998 | Winterbottom | 709/226 |
| 5,926,117 | A | * | 7/1999 | Gunji et al. | 340/988 |
| 5,937,163 | A | * | 8/1999 | Lee et al. | 709/218 |
| 5,960,214 | A | * | 9/1999 | Sharpe et al. | 710/15 |
| 6,047,320 | A | * | 4/2000 | Tezuka et al. | 709/223 |
| 6,216,168 | B1 | * | 4/2001 | Dev et al. | 709/245 |
| 6,370,454 | B1 | | 4/2002 | Moore | |
| 6,374,293 | B1 | * | 4/2002 | Dev et al. | 709/220 |
| 6,466,971 | B1 | * | 10/2002 | Humpleman et al. | 709/220 |
| 6,505,100 | B1 | | 1/2003 | Stuempfle et al. | |
| 6,519,626 | B1 | * | 2/2003 | Soderberg et al. | 709/203 |
| 6,546,415 | B1 | * | 4/2003 | Park | 709/202 |
| 6,587,874 | B1 | * | 7/2003 | Golla et al. | 709/220 |
| 6,868,074 | B1 | * | 3/2005 | Hanson | 370/328 |
| 6,996,611 | B1 | * | 2/2006 | Muto | 709/223 |
| 7,024,476 | B1 | * | 4/2006 | Page et al. | 709/224 |
| 7,099,937 | B1 | * | 8/2006 | Ochiai et al. | 709/224 |
| 7,123,925 | B2 | * | 10/2006 | Robinson et al. | 455/456.1 |
| 7,130,278 | B1 | * | 10/2006 | Hennenlotter | 370/254 |
| 7,222,292 | B2 | * | 5/2007 | Ali et al. | 715/236 |
| 7,293,067 | B1 | * | 11/2007 | Maki et al. | 709/217 |
| 7,383,330 | B2 | * | 6/2008 | Moran et al. | 709/223 |
| 7,383,347 | B2 | | 6/2008 | Ebling et al. | 709/232 |
| 7,493,565 | B2 | * | 2/2009 | Parupudi et al. | 715/744 |
| 2001/0039587 | A1 | * | 11/2001 | Uhler et al. | 709/229 |
| 2002/0019864 | A1 | * | 2/2002 | Mayer | 709/223 |
| 2002/0035609 | A1 | | 3/2002 | Lessard et al. | |
| 2002/0059320 | A1 | * | 5/2002 | Tamaru | 707/200 |
| 2002/0091819 | A1 | * | 7/2002 | Melchione et al. | 709/224 |
| 2002/0165645 | A1 | * | 11/2002 | Kageyama | 701/1 |
| 2003/0097438 | A1 | * | 5/2003 | Bearden et al. | 709/224 |
| 2003/0109270 | A1 | * | 6/2003 | Shorty | 455/517 |
| 2003/0110252 | A1 | * | 6/2003 | Yang-Huffman | 709/224 |
| 2003/0114981 | A1 | * | 6/2003 | Allen et al. | 701/213 |
| 2003/0131113 | A1 | * | 7/2003 | Reeves et al. | 709/229 |
| 2004/0083210 | A1 | * | 4/2004 | Ochiai et al. | 707/3 |
| 2004/0172466 | A1 | * | 9/2004 | Douglas et al. | 709/224 |
| 2004/0203931 | A1 | * | 10/2004 | Karaoguz | 455/457 |
| 2004/0260800 | A1 | * | 12/2004 | Gu et al. | 709/223 |
| 2005/0010663 | A1 | * | 1/2005 | Tatman et al. | 709/224 |
| 2005/0149468 | A1 | * | 7/2005 | Abraham | 707/1 |
| 2008/0301298 | A1 | * | 12/2008 | Bernardi et al. | 709/226 |
| 2009/0006840 | A1 | * | 1/2009 | Birger et al. | 713/151 |
| 2010/0302974 | A1 | * | 12/2010 | Niiyama et al. | 370/254 |

FOREIGN PATENT DOCUMENTS

| | | |
|---|---|---|
| EP | 1134940 | 9/2001 |
| EP | 11788458 | 2/2002 |
| JP | 2001117637 | 4/2001 |
| JP | 2002024341 | 1/2002 |
| JP | 2002332662 | 11/2002 |

OTHER PUBLICATIONS

OSYRIS—Open System for Road Information Support (Retrieved from http://www.rz.uni-karlsruhe.de/~gm03/ae_osyris_base_for_article.pdf).

Open System for Road Information Support (Retrieved from http://www.rz.uni-karlsruhe.de/~gm03/ae_osyris_isarc18-1.pdf).

* cited by examiner

METHOD AND APPARATUS FOR MANAGING INFORMATION EXCHANGES BETWEEN APPARATUS ON A WORKSITE

FIELD OF THE INVENTION

The invention relates to the field of information exchange management, for communicating e.g. with fixed and/or mobile apparatus operating in connection with a worksite, e.g. for civil engineering construction, landscaping, road-building, local geography modification, mining, etc.

BACKGROUND

Such management can nowadays be automated to a large extent through specific computer tools and remotely controlled earth moving units. The automation calls for an efficient exchange of information at all levels, both on and off the site, and preferably in real-time.

Typically, the information flow is relayed through one or more management points. For instance, three-dimensional site models can be generated and updated at an off-site source and sent as site strategic or operative information to an on-site office serving as a local management centre. In response, the latter derives and manages site operative information and instructions for the automated machinery and man-machine interfaces, and reports back to the off-site source.

FIG. 1 illustrates in block diagram form some possible data exchange points used in the management of a worksite.

The off-site office 2 constitutes the main centre for site strategic and operative information exchange, possibly in conjunction with one or several peripheral departments 3 or sub-contractor off-site offices. This high-level information is exchanged with the worksite via a main on-site office 4, which serves as a centralized relay point. The site may comprise multiple on-site offices, each communicating directly with the off-site office. The on-site office further operates as a management centre for communications, personnel and equipment on the site, with which it exchanges operative information. In the example, the main on-site office exchanges data with:

- surveying equipment 6, specifically dedicated to geometrical data acquisition, e.g. total stations, theodolites, laser rangefinders, etc.,
- equipment for assessment of geographical information (GIS) 6a as locations of special objects and their properties,
- mobile unit positioning devices 8, e.g. GPS (global positioning by satellite) receivers, to determine the instant position of mobile apparatus such as excavators, bulldozers, trucks, cranes, etc.,
- mobile unit actuators or servos 10, generally through radio-controlled on-board units which command the machinery, either for its displacement along the worksite (propulsion motors) or for actuating a tool, such as a bucket, pneumatic drill, ram, blade, etc.,
- on-board sensors 12, for instance to determine the unit's operating parameters, such as fuel level, engine temperature, totalized operating time, idle time, load time, wear indicators, etc.,
- ground-based sensors 14, for instance GPS reference stations or apparatus to determine local temperature, humidity, soil characteristics, etc., and
- human operator terminals 16, i.e. man-machine interfaces such as control panels, monitors, etc. which may be carried or fixed.

At least some of the above devices can exchange data via one or more fixed site sub-offices 18 which form fixed hubs, e.g. allocated to a particular part of the site, or a specific type of data/machinery.

In addition to the above physical system management, the central on-site office 4 also manages some administrative tasks at a local level, for instance regarding personnel, progress reports, scheduling of tasks and resources, contacts with local authorities, sub-contractors, material flow, etc. These tasks are performed with computer programs such as spreadsheets, databases, specific software, etc. which are routinely exchanged and updated with the off-site office 2.

In the context of road construction, there has been proposed an open system for road information support known under the name "Osyris". The aim of this system is to enable contractors and road owners to create their own knowledge bases and quality assurance systems operative over different stages of the road's production and life cycle.

The Osyris system is built on three main component levels: office, on-board computer, and measurement system. The components are assigned to one of the levels; only the framework components, i.e. the product model an mobile services, reside on all levels, linking them together and hence building the backbone of the system.

While this prior art system goes some way towards rationalizing the data flow, there remains a need to for a communications system which allows fully autonomous communication at all levels, with seamless access to the different communications interfaces.

For instance, it would be an advantage if the different entities 6-16 mentioned above could also be able to communicate among themselves directly using a structured address format to allow for a more natural, decentralized, management of information flow. It would also be of advantage if the same communications protocol could be used for all the communications interfaces.

More generally, there is a need for a communication system that allows the hierarchical data exchange structure to be made as flexible as possible, enabling apparatus to communicate with other apparatus without restriction on their respective levels of hierarchy and also allowing different parties on and off the site to be able to address different items of apparatus using a simple, organized address format.

An example of a prior art communications with a working machine is disclosed in Patents Abstracts of Japan vol. 2003, No. 03, May 5, 2003 & JP 2002 332662. The communications are effected through the IP network, with each working machine being assigned an IP address managed through a server.

An IP address as such does not give a direct indication of a possible hierarchical level of a given machine. Indeed, the numbering system used for creating IP addresses is generally based on a sequence of four decimal numbers separated by a period. The first (left-most) number indicates the network address, while the fourth (right-most) number designates the specific network machine or host. That fourth number is allocated according to availability and is not amenable to expressing specific characteristics of its network machine, such as its chain of dependency, i.e. hierarchical position, with respect to other machines in a chosen hierarchical system.

Accordingly, a human or machine presented with just the IP number of a machine on the site cannot immediately identify the context of that machine.

In the field of vehicle maintenance, patent document U.S. Pat. No. 6,370,454 discloses a system of distributed sensors cooperating with an on-board computing device adapted to communicate over the Internet to a local computing device, such as a personal digital assistant. The Internet is used for accessing remote servers to obtain information e.g. on the performance and service of the vehicle.

SUMMARY

According to a first aspect, the invention provides a method of managing information exchanges in a worksite, by networking items of apparatus which perform tasks in connection with the worksite and which receive and/or send data, the method using an electronic data network comprising management means cooperating with a plurality of communications interfaces, a given item of apparatus having a data link with a specified the communications interface, characterised in that:
- at least some items of apparatus are organized in hierarchical levels according to a determined dependency relationship of the worksite, and in that the management means:
- stores a correspondence between each aforementioned item of apparatus organized in a hierarchical level and an address structure reflecting the hierarchical position of that item of apparatus in the determined dependency relationship of the worksite, and
- uses that correspondence to establish a communications link with a selected item of apparatus, via its communications interface, in response to a call addressed with an address structure reflecting the hierarchical position of the selected item of apparatus.

In this way, it is possible, say, for an item of apparatus or a communications interface on or off the worksite to designate, and establish communication over the network with, a selected item of apparatus, or class of apparatus through an address field in which is entered the address structure reflecting the hierarchical position of the addressed items(s) of apparatus. Such an address structure is more convenient than an IP number per se, as it can be organized in a manner that is immediately intelligible to a human operator or that can be derived automatically e.g. from an electronically stored directory structure that itself expresses the hierarchy in question, as explained below in connection with the optional embodiments.

In a preferred embodiment, each of the networked items of apparatus is organized in accordance with the hierarchical levels and has an address according to the aforementioned address structure to cooperate with the management means as defined above.

The form of the addresses used for accessing the items of apparatus is thus meaningful to human and machine operators.

Moreover, the present address structuring can be made to accommodate automatically for changes in respect of items of apparatus added to, removed from, or changed from one group to another, or changes from one hierarchical structure to another. The corresponding change can be clearly reflected by the new address structure, whereby an operator or electronic system informed of a change of address of an item of apparatus can immediately deduce the corresponding change in its hierarchical position. Conversely, an operator or electronic system informed of change in hierarchical position of an item of apparatus can deduce the new address e.g. by creating the corresponding new directory path.

Also, if a new item of apparatus is added, say, to a group of items of apparatus at a certain position in the hierarchical structure, then that new item can be accessed de facto by an operator or electronic system designating e.g. the directory-path for all items in that group, even without being informed of that addition.

In a preferred option, the communications interfaces are accessed in this manner using a uniform resource locator (URL) format, which comprises a domain name—which can designate the specific worksite, for instance—and a directory-path for connecting to a specific communications interface (the latter being an example of a host device or server). The directory-path can then be made to correspond to the aforementioned address structure, with the front slash(es) delimiting sub-directories mirroring the level(s) of hierarchy to which belongs the item of apparatus associated to the communications interface in question.

In an application, a PC terminal with an IP browser can be connected to the aforementioned electronic data network, either from outside or within the worksite. A human operator or electronic system can thus call a specific item or class of apparatus on a particular worksite by entering on the browser display or computer field the corresponding URL, where the domain name designates the worksite in question, and the directory-path specifies the apparatus according to its hierarchical level. The operator does not need to know the IP address of that item of apparatus. Likewise, a database or control device can send messages to selected items of apparatus by electronically generating the corresponding URLs, using a standardized directory-path structure, again without having to know the corresponding IP addresses.

As explained below in more detail, hardware or software conversion tools, e.g. based on preprogrammed look-up tables, can be provided to enable a particular user (human or machine) to use a custom hierarchical organization for considering the items of apparatus, different from the one used by the worksite manager operating the aforementioned communications interfaces. The tool ensures the seamless conversion of an address structure, expressed according to the custom hierarchical organization for designating a particular item or class of apparatus, into the address with the directory-path used by the worksite network manager to designate the same item or class of apparatus. The conversion tool may instead convert directly the custom directory-path into the IP address (or equivalent network address) of the corresponding communications interface.

The correspondence stored by the management means can e.g. correlate, for each item of apparatus, a port or destination address on the network for reaching that item of apparatus, via its communications interface, with the aforementioned address structure reflecting the hierarchical position of the corresponding item of apparatus.

The method can comprise the step of accessing from outside the worksite a selected item of apparatus through the electronic data network by using an address comprising the address structure reflecting the hierarchical position of the selected item of apparatus.

The management means can operate by converting the address structure reflecting the hierarchical position of the selected item of apparatus into a corresponding device address for accessing the selected item of apparatus on the electronic network, for example the IP (Internet Protocol) address, and by using that device address to call the communications interface to which the selected item of apparatus has a data link.

The address structure reflecting the hierarchical position of the selected item of apparatus can be expressed as a directory-path.

The worksite can be identified by a generic portion of the address that comprises the address structure reflecting the hierarchical position of a selected item of apparatus.

The address structure reflecting a hierarchical position of an item of apparatus can be a Uniform Resource Locator (URL), the URL having a directory-path portion corresponding to the address structure reflecting the hierarchical position of the selected item of apparatus.

The uniform resource locator can have a hostname portion that is specific to the worksite.

The worksite can be an outdoor worksite comprising any one of:
i) a civil engineering worksite,
ii) a landscaping worksite,
iii) a road or rail link construction worksite,
iv) a mining worksite, e.g. an open-cast mine.

The method can further comprise a step of converting an address structure designating an item of apparatus to be accessed in accordance with a second hierarchy, different from the hierarchy used by the management means to organize the hierarchical levels according to the determined dependency relationship, into the network address of the designated item of apparatus.

The method can further comprise assigning a separate class/sub-class, in the hierarchical position relation, to items of apparatus as a function of whether they are static or mobile on the worksite.

At least some items of mobile apparatus can be given the additional function of relaying messages over the electronic network.

The method can further comprise a step of determining a current position of items of mobile apparatus and managing the distribution of messages within the electronic network accordingly.

A first level class/sub-class of item of apparatus, in the hierarchical position relation, can comprise mobile units, a second level of sub-class being at least one command responsive functionally within the mobile unit.

The method can further comprise a step of securing communications by providing technical means for restricting access to the network to only authorized communications interfaces.

The method can further comprise a step of limiting data transmissions to between only those items of apparatus which are mutually compatible or expected to communicate with each other over the electronic network.

The method can further comprise the step of providing a centralized monitoring and/or management of messages exchanged over the electronic network.

The method can further comprise the step of providing a centralized management of static or dynamic identification allocation to the communications interfaces operating in the network.

The method can further comprise executing automatically a work plan programming the tasks of the items of apparatus automatically to conduct operations in the worksite, commands of the work plan designated selectively items of apparatus using the address structure reflecting the hierarchical position of the selected item(s) of apparatus.

The items of apparatus can communicate to each other, a call being made from one item of apparatus to another using the address structure reflecting the hierarchical position of the selected item of apparatus.

According to a second aspect, the invention concerns the use of the method according to the first object for managing an automated worksite in which commands are sent to contour changing apparatus and to on-board apparatus through the defined protocol, the commands being elaborated from a predetermined model.

According to a third aspect, the invention concerns of use the method according to the first aspect for managing an automated worksite in which physical and logical addressing of the communications interfaces is separated with a unique ID other than the IP address i.e. permitting multiple/different IP and/or unique ID addressing.

According to a fourth aspect, the invention relates to a system for managing information exchanges in a worksite, comprising an electronic communications network connecting items of apparatus which perform tasks in connection with the worksite and which receive and/or send data, the electronic data network comprising management means cooperating with a plurality of communications interfaces, a given item of apparatus having a data link with a specified communications interface, characterised in that:

at least some items of apparatus are organized in hierarchical levels according to a determined dependency relationship of the worksite, and in that the management means comprises:
means for storing a correspondence between each aforementioned item of apparatus organized in hierarchical levels and an address structure reflecting the hierarchical position of that item of apparatus in the determined dependency relationship of the worksite, and means operating on the basis of the correspondence to establish a communications link with a selected item of apparatus, via its communications interface, in response to a call addressed with an address structure reflecting the hierarchical position of the selected item of apparatus.

The stored correspondence can e.g. correlate, for each item of apparatus, a port or destination address on the network for reaching that item of apparatus, via its communications interface, with the aforementioned address structure reflecting the hierarchical position of the corresponding item of apparatus.

The optional aspects of the invention presented in the context of the method (first to third objects) are applicable mutatis mutandis to the system according to the fourth object.

BRIEF DESCRIPTION OF THE DRAWINGS

The invention and its advantages shall become more apparent from reading the following description of the preferred embodiments, given purely as non-limiting examples, with reference to the appended drawings in which.

DETAILED DESCRIPTION

Figure 1:
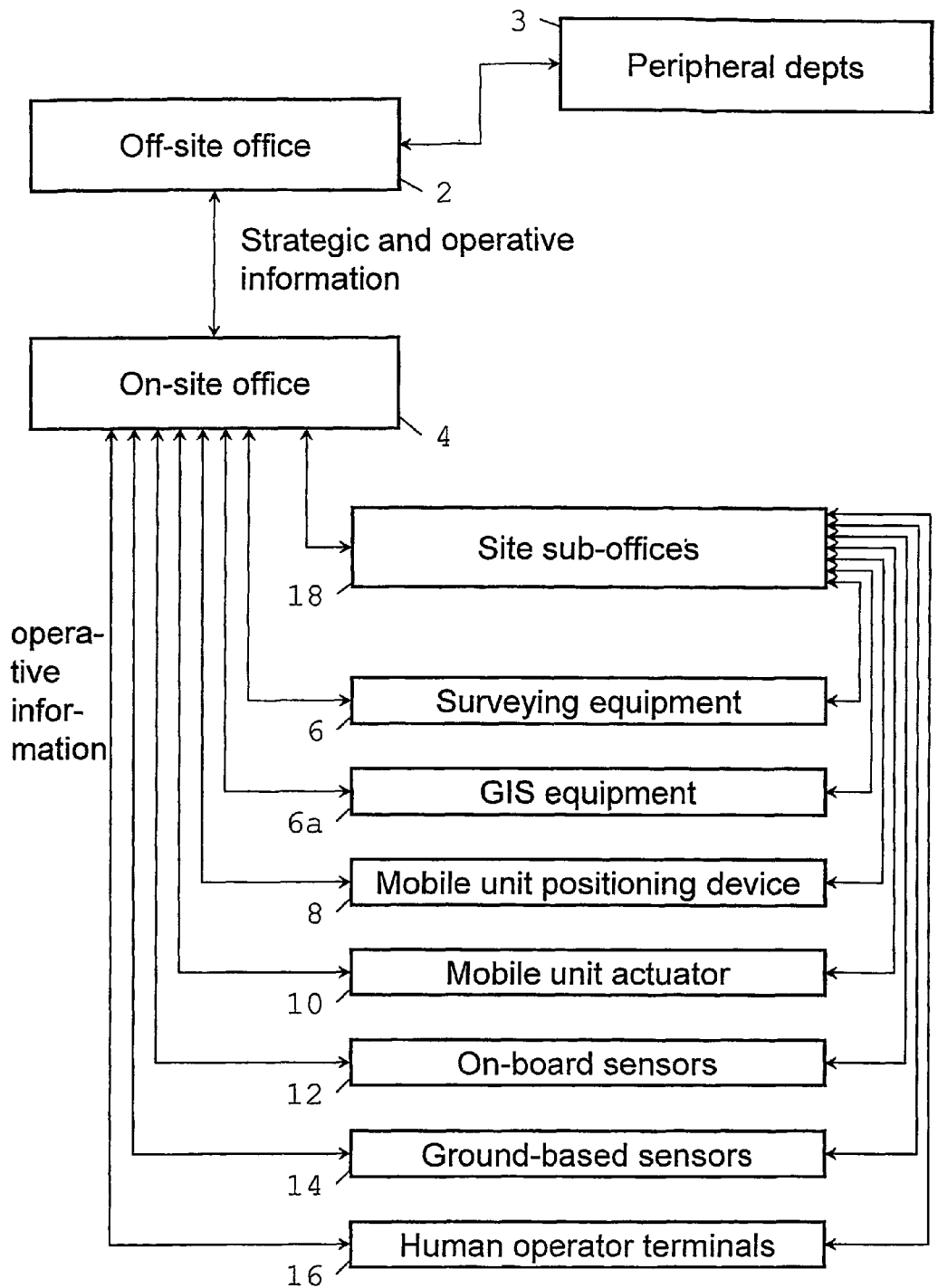
FIG. 1, already described, is a simplified block diagram illustrating the different types of communications interfaces typically present in an automated civil engineering site.
Figure 2:
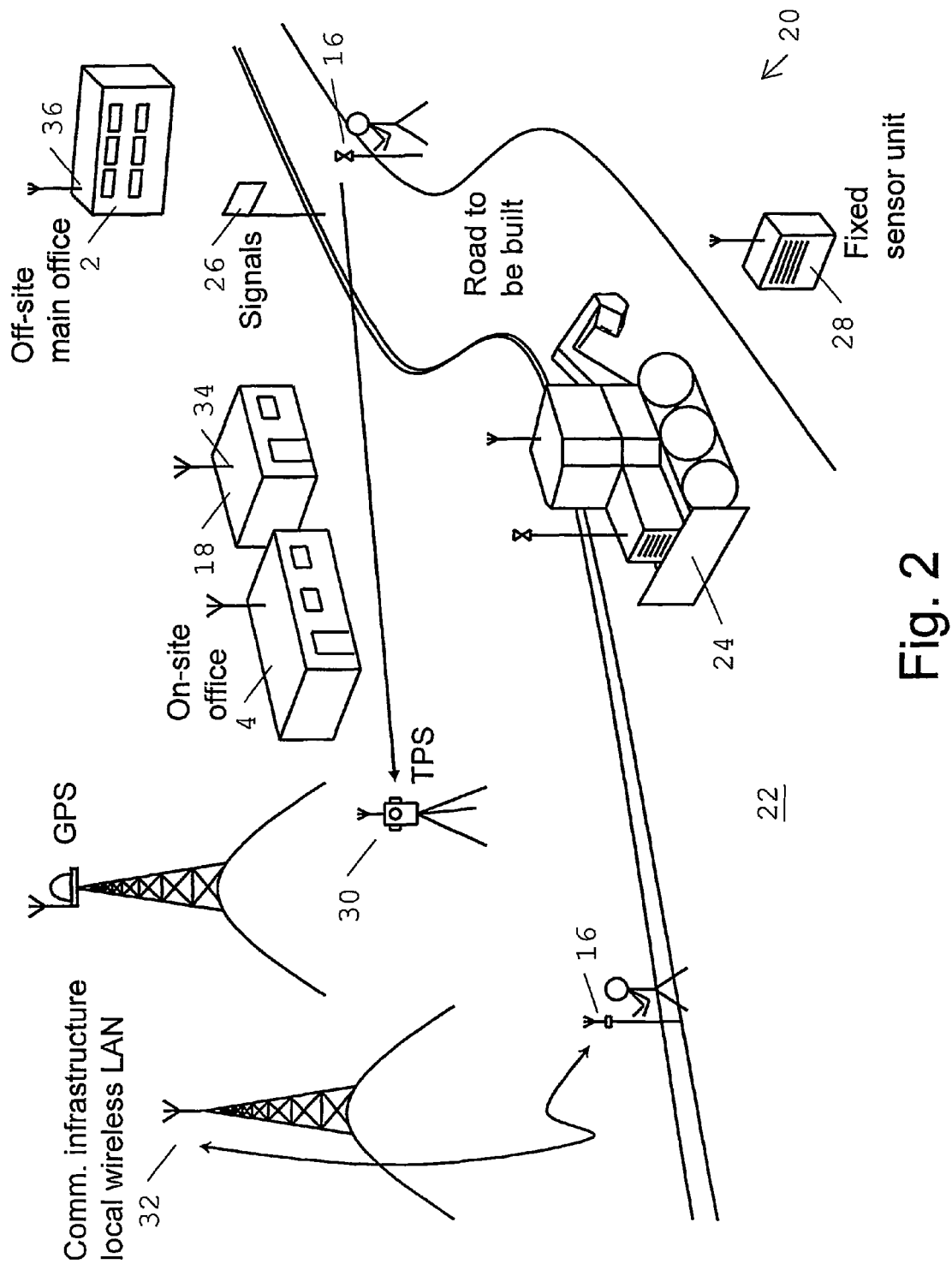
FIG. 2 is a conceptual diagram of a part of a worksite in which a road is being built, showing the different networked communications links available for the exchange of data and which can be used in accordance with the invention.

The example of the worksite 20 illustrated in FIG. 2 serves to show some of the communications means available between the different communications interfaces operating on a civil engineering worksite. The latter can include some or all of the entities 2 to 18 described above with reference to FIG. 1, as well as others, depending on requirements. These entities are identified by the same reference numerals as for FIG. 1, and their description with regard to that figure is incorporated herein by reference to avoid undue repetition.

The part of the worksite 20 illustrated concerns the construction of a road 22, and hence involves a change in the local geography by modification of the local contour.

As explained in the introductory portion, the on-site office 18 ensures the general local management of the worksite. In the example, this is broken down into three classes of tasks:
  monitoring of the construction site and exception handling,
  management of resources, work assignment, scheduling, etc.,
  integration of design, surveying, geographical, and progress information,
  managing communications on the electronic communications network, both with on-site items of apparatus and with external entities (off-site office, clients, contractors, etc.).

The on-site office manages both human and machine resources. The former include engineering and technical personnel equipped with terminals 16 through which they can enter or monitor data. These terminals are linked to portable equipment such as surveying apparatus, positioning devices, sensors, etc, or to on-board equipment, such as in plant machinery. An example of a portable interfacing equipment is the laser rangefinder terrestrial positioning system (TPS) produced by Leica Geosystems, a description of which can be found at the web address http://www.leica-geosystems.com/surveying/product/totalstations/tcr300.htm.

The machine resources (items of apparatus) comprise:
  mobile geography altering unit, such as a bulldozer 24, equipped with earth-moving tools. The mobile units can be fully automated both with regard to their displacement along the worksite and to the operation of their tools; and
  static apparatus, such as floodlights, signaling lights 26, e.g. for personnel or the public, fixed sensor units 28, e.g. for atmospheric conditions, noise levels, etc, laser markers, wireless transmission relay units, etc.

In the example, the wireless transmission relay units comprise:
  a main radio mast 32 forming part of a communication infrastructure for a wireless local area network (WLAN),
  a wireless data hub 34 at the on-site sub-office 18,
  a wireless data communication terminal 36 at the level of the off-site main office 2, and
  some or all of the communications interfaces on the worksite, these being assigned the additional role of relaying stations to constitute a dynamic wireless network, as shall be explained in more detail further. Indeed, each item or cluster of items of the machine resources (hereafter referred to as a communications interface CE) is also equipped with communicating devices which use the wireless communication infrastructure.

Communication, at all levels, uses the Internet protocol (IP) and an addressing scheme based on Uniform Resource Locators, know per se by the acronym URL (also known as a universal resource locator). This is achieved by attributing each communications interface with its own URL, through which it is identified and accessible, the URL further reflecting the hierarchical level of the item(s) of apparatus for which it provides a data link, as shall be explained further.

To recall, a URL is generally a reference—or address—to a resource on the Internet. A URL is typically used e.g. for accessing a file on a device connected to the Internet, and allows all resources on the Internet to be identified with a common addressing system. A URL typically has the following form:
  service://hostname: port/directory path.

The "service" is the Internet communications service, such as telnet, file transfer protocol, gopher, mailto, etc.

The "hostname" is either a numeric code assigned to a server-computer on the Internet, or the name attributed to that computer. This is a unique name or number that allows the specific server to be located on the Internet.

The "port" is an optional designation accompanying the hostname for determining on which port the computer is to be accessed. The "port" part of a URL is often not required or used, since many web services use standard ports.

The "directory-path" is the name of the directory and possible subdirectory (or subdirectories), ending with the name of the file to be accessed by the URL. Each level of directory, subdirectory and file is separated by a "/" (forward slash) symbol.

In the embodiment, the hostname portion is used to designate the specific worksite 20.

Figure 3:
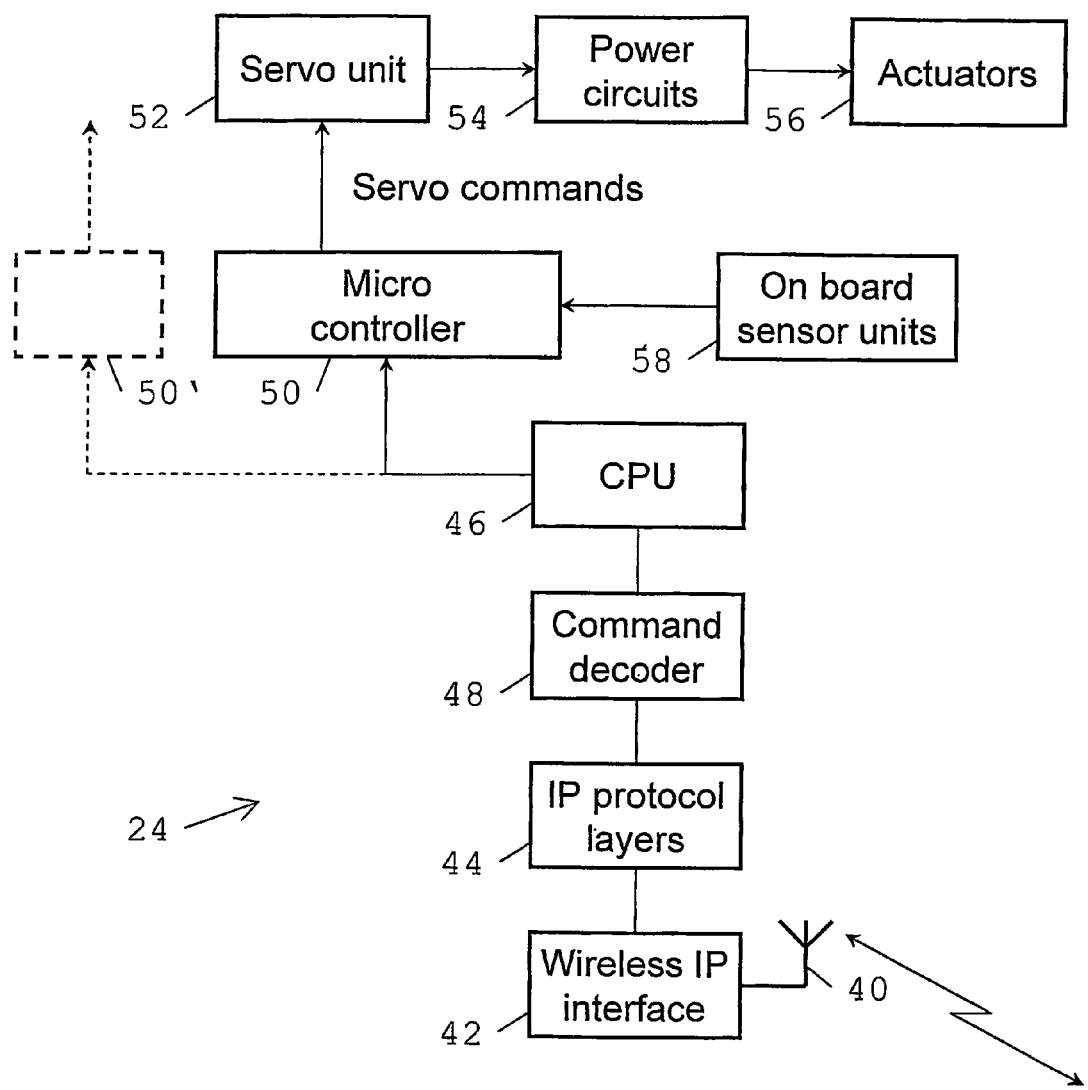
FIG. 3 is a block diagram showing functional units involved in commanding actuators of a bulldozer and sending out sensor data through IP (Internet Protocol) messages in the worksite communication system according to FIG. 2.

FIG. 3 illustrates the main functional elements on board a powered apparatus, such as a bulldozer 24, for exchanging such IP commands with communications interfaces using their URLs. In the example, the commands are directed to a servo unit that commands actuators, such as the rams for the mechanical shovel.

The powered apparatus is equipped with an antenna 40 connected to an on-board wireless IP interface unit 42 comprising the radio and base band layers for effecting a two-way radio link with other communications interfaces on the site. The wireless IP interface 42 communicates internally through a firmware unit 44 containing the necessary IP protocol layers for formatting ingoing and outgoing messages. The messages are interfaced by the apparatus' command CPU 46 through a command decoder unit 48 using standard techniques.

The CPU communicates with at least one dedicated microcontroller unit 50 which is specifically adapted to handle low-level commands to the actuator under its control, e.g. the hydraulic ram drives. The microcontroller thus sends servo commands to a servo unit 52, which controls the required power circuits 54 for driving the actuators 56. Further microcontroller units 50' and the respective sub-units are indicated in FIG. 3 by means of dotted lines.

The microcontroller 50 also manages feedback data from local on-board sensor units 58 associated with the actuators, power circuits or servo unit, e.g. hydraulic pressure sensors, strain gauges, etc.

The IP protocol layers 44 and wireless interface 42 together enable the apparatus to communicate with the outside as a web server. To this end, they include all the protocol layers required to constitute an autonomous server with a specific URL directory-path.

The web server can be centralized for all tasks concerning the bulldozer, in which case all ingoing and outgoing messages are routed through the latter. Alternatively, the management within the bulldozer can be decentralized to one or more sub-levels of hierarchy, where each level and sub-level is identified respectively in terms of a directory and a subdirectory of the URL directory path associated to a hostname for the site. For instance, the microcontroller 50 associated to the actuator servo unit 52 can have its own wireless IP interface, IP protocol layers and command decoder for communicating directly with the other communications interfaces on the worksite. In this way, commands pertinent only to the actuator servos can be handled directly at that sub-level of hierarchy through the appropriate directory-path of the URL messages, without having to call upon other communication and IP resources of the bulldozer. The universal use of the same messaging protocol, in this example based on a common hostname on the IP protocol, irrespective of the level of communications interfaces, allows complete freedom for cross-communication among two or more communications interfaces, irrespective of their relative hierarchical levels.

Figure 4:
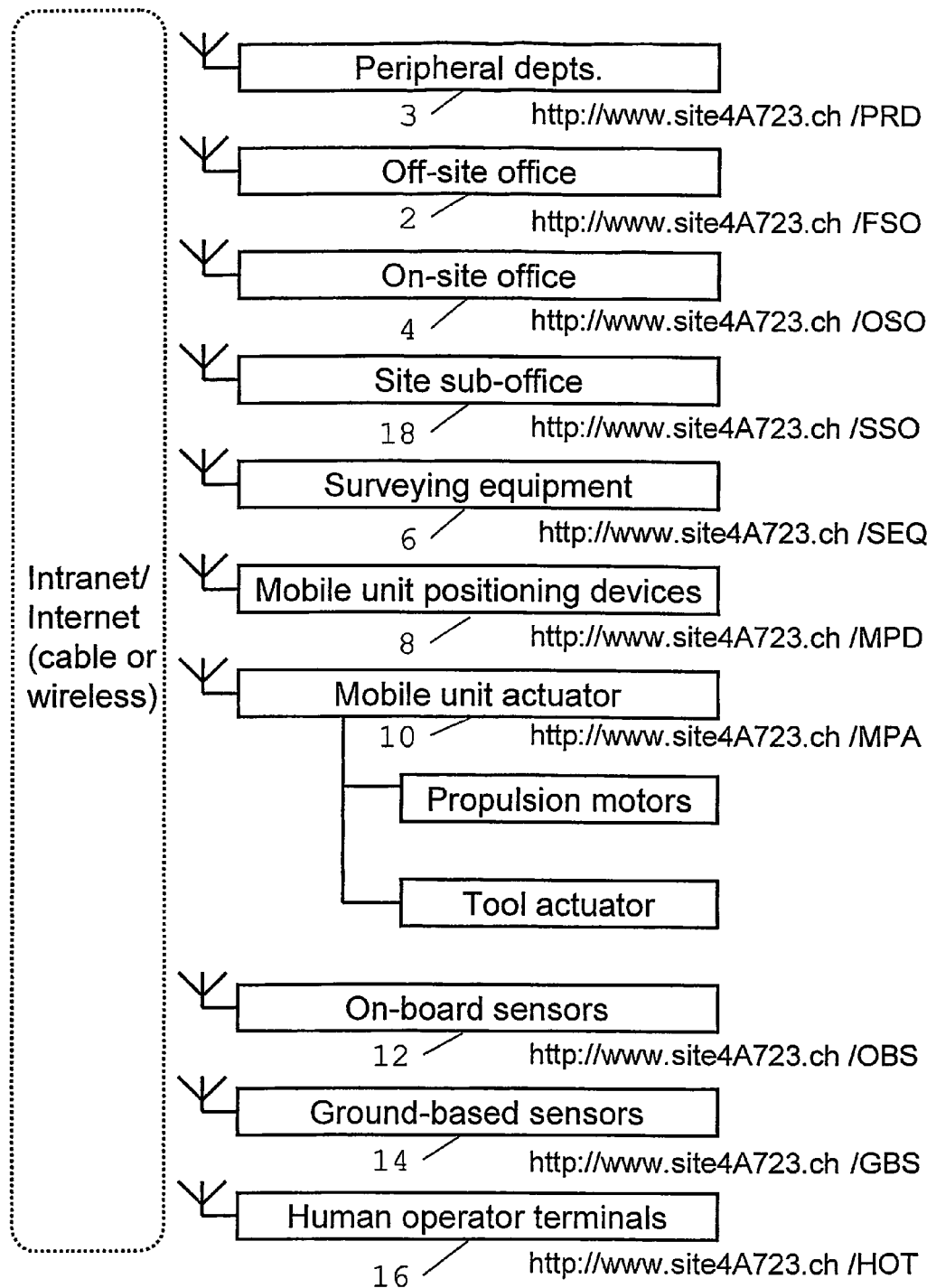
FIG. 4 is a simplified block diagram illustrating the different types of communications interfaces typically present in an automated civil engineering site, additionally showing the allocation of their respective URLs through which they can be addressed.

FIG. 4 illustrates an example of URL and directory-path attribution for the communications interfaces of FIG. 1.

The entire worksite 20 is allocated a specific hostname in the URL, in the example "site4A723.ch". The hostname is defined arbitrarily by the main worksite manage using his own referencing system to distinguish from other worksites and in accordance with their availability for registration before a domain name administrator.

Communications interfaces are then individually accessible through a directory and possibly one or more subdirectories in the directory path portion of the URL, following the site's hostname. The directory (name appearing after the first "/" in the URL corresponds to the highest level of hierarchy under the central management of the site. A first subdirectory for a particular directory designates a first level of subclass, and a sub-subdirectory designates a sub-subclass, etc. Thus, the hierarchical organization of the communications interfaces is reflected by a corresponding hierarchy of directory and levels of subdirectories identified in the URL directory-path. Any communicating device, irrespective of its level, can use the IP protocol in this way to communicate directly with any other communicating device by entering the URL and directory-path of the latter. In the illustrated example, each class of device operating in the worksite is allocated a respective directory identified by a group, or string, of characters as follows:

off-site office 2: Directory=FSO,
peripheral departments 3: Directory=PRD,
on site Office 4: Directory=OSO,
surveying equipment 6: Directory=SEQ,
mobile unit positioning devices 8: Directory=MPD,
mobile unit actuators 10: Directory=MPA,
on-board sensors 12: Directory=OBS,
ground-based sensors 14: Directory=GBS,
human operator terminals 16: Directory=HOT,
site sub-office 18: Directory=SSO.

Any number of other directories can be provided as required, e.g. the embodiment has a directory for roving apparatus, identified by the character string RA for "roving apparatus" (Directory=RA).

The subdirectories are attached to a given class according to a hierarchical or tree structure.

Figure 5:
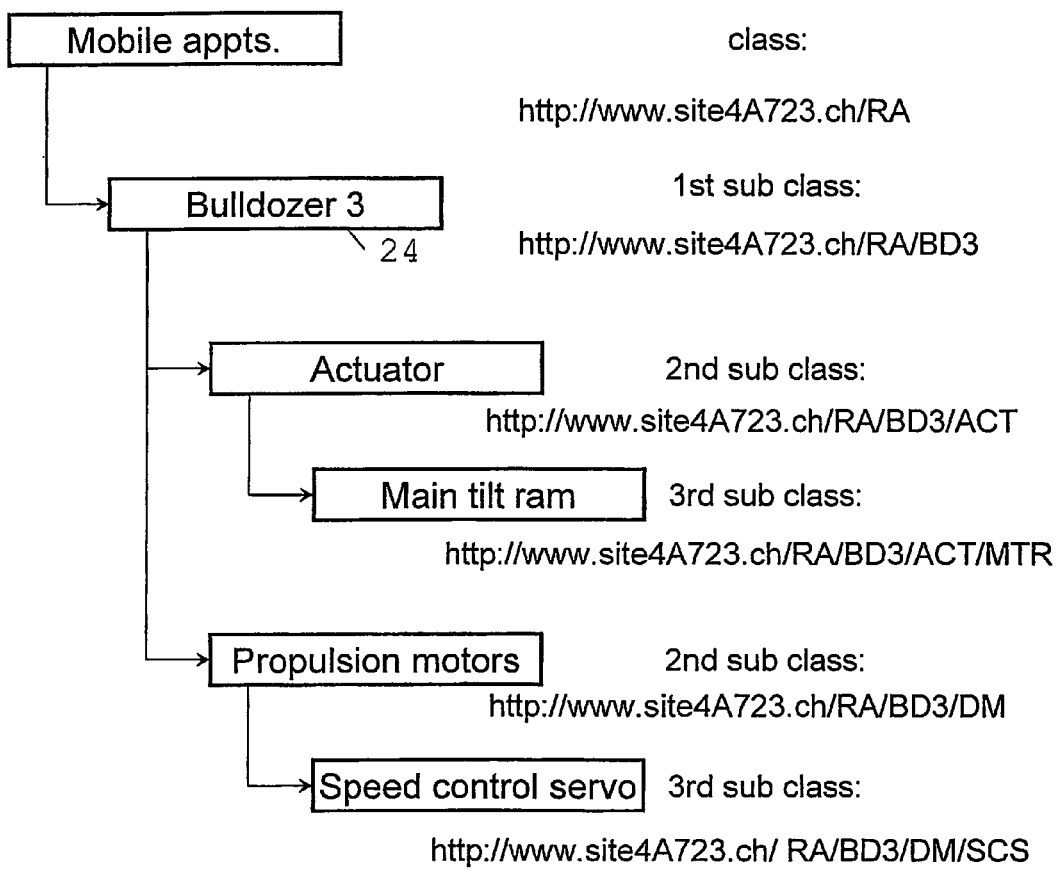
FIG. 5 is a block diagram showing an example of sub-levels in the URL addressing scheme illustrated in FIG. 4.

For instance, FIG. 5 illustrates the case where the communications interface is the mobile apparatus of FIG. 3. As such, its URL address will have in its directory path the class suffix "RA", common to all roving/mobile apparatus on the site and corresponding to a class. The URL for that class RA is thus http://www.site4A723.ch/RA, analogously to the examples given with reference to FIG. 4.

The hierarchy provides for a first sub-class according to the type of mobile apparatus, each type being identified by a group of characters, for instance: "TT" for tipper truck, "BD" for bulldozer, "MS" for mechanical shovel, etc.

Accordingly, all bulldozers will have in their URL a directory-path containing "RA/BD...". Each mobile apparatus of a particular type is attributed a unique identification number N (N=1, 2, 3, ...) which is attached immediately after its type identification. Thus, if the bulldozer in question is attributed the identification number "3", it can be uniquely addressed in the URL addressing scheme with the form "RA/BD3/... in the directory-path.

A second level of subclasses, one level down in the hierarchy from the preceding subclass, serves to identify the different groups under the central command of the device belonging to that preceding subclass. These groups thus each represent the highest level of hierarchy under the command of the CPU 46, referring to the example of FIG. 3. For a bulldozer, e.g. BD3, the groups would e.g. each centralise respective main functions of the bulldozer: the command of actuators, command of main drive motor for propulsion, etc. Each second level subclass is likewise identified by a group of characters, and can be accessed by inserting its corresponding group of characters immediately after the character group of its next level up in the hierarchy when forming the URL directory-path.

Following the same scheme, an arbitrary number of subclass levels can be added, each one going down one level deeper in the hierarchy and expressed by a corresponding level down in the URL directory path.

The example of FIG. 5 shows a case where three levels of sub-class are used. Specifically, the bulldozer itself with its unique identification constitutes the first sub-class of mobile apparatus (RA/BD3...), for which the URL in the example is http://wwww.site4A723.ch/RA/BD3. There are shown two sub-classes, respectively for the group of actuators (identified by "ACT") and the propulsion drive motor (identified by "DM"). In this way, a communication can be established with the main actuator command centre of bulldozer 3 by addressing its URL http://wwww.site4A723.ch/RA/BD3/ACT, for instance.

The microcontroller 46 can be programmed to identify the item of apparatus, e.g. an actuator, from that directory-path. It can thus access that item of apparatus (e.g. actuator) and activate the corresponding software/firmware modules specific to managing that item of apparatus (e.g. actuator). In other words, the microcontroller distributes commands and data selectively to different items of apparatus under its control on the basis of the last subdirectory of the directory-path, just after the one designating the group which the microcontroller controls, and passed on by its communications interface 42-48.

The propulsion motor command group is divided into a number of sub-command structures, each allocated to a specific set of tasks and directly accessible as a communications interface. To this end, these sub-command structures constitute a third level of sub-class. The example shows how a drive motor speed control servo unit (identified by "SCS".) is made accessible as a third level sub-class with the URL http://www.site4A723.ch/RA/DB3/DM/SCS.

Being incorporated into a URL with a common hostname for the site, each communications interface, irrespective of its hierarchical level, can enter into communication with the speed control servo command unit of bulldozer 3, say, simply by producing the latter's URL http:/www.site4A723.ch/RA/DB3/DM/SCS in its browser.

Once that addressee has been accessed at the URL, a communication channel is established between the latter and the addressor, the latter being e.g. a remote traffic control unit for the worksite. The communication channel can be established by any known technique using standardized protocols according to the characteristics of the network(s) used. Security can be provided by known encryption techniques, firewalls, virtual private networks CVPN), etc.

The exchanged messages (commands, data, etc.) constitute the payload of the data packets exchanged. As such, the internal structure of the exchanged messages can be adapted to any protocol as required, for instance adapted to the level of interfacing of the recipient, and is thus independent of the IP protocol.

The scheme thereby allows any communications interface, both on and off the worksite, to access any other entity through a unique Internet address of the latter, using the hierarchical address structure by the URL.

The exchange of data can be bidirectional, with the addressor communicating its own address to the addressee, following the normal rules of the IP protocol, for instance by subsequently identifying the IP address of the addressee and addressor for exchanging data packets, or simply by using an email exchange in which each communicating device is attributed its own email address.

The email address can follow the generic form: device@hostname/directory-path. It can thus respect the directory and subdirectory structure as explained above for the URL. For instance, the drive motor speed control servo unit SCS can be addressed at email address: device@site4A723.ch/RA/BD3/DM/SCS. Other ways of creating the email address respecting the hierarchy and directory-path correspondence can be envisaged, e.g. by inserting the directory-path as the identifier and replacing the "/" symbols with "-". Reverting the previous example, the email address of speed control servo unit SCS would then be: RA-BD3-DM-SCS@site4A723.ch.

In some circumstances, it is useful to address collectively items of apparatus that do not necessarily share the same intervening links in their directory path, i.e. which may have one or several mutually different nodes in the hierarchical tree going towards the root.

For instance, in the example of FIG. 5, a contractor in charge of bulldozer maintenance may wish to send a common message to all speed control servo drives of motors in roving apparatus operating on the site, that message being e.g. a request for an update on logged operating time. In terms of a directory-path structure, the access to those items of apparatus above would have the form: RA/ * / DM/SCS, where "*" is a wildcard. This wildcard effectively replaces each and every subdirectory node depending from RA (for roving apparatus), including bulldozer BD3.

The network communications manager operating for the site is programmed to reconstruct all the respective URLs possible by inserting, in each reconstructed URL, a respective one of the designations of each and every node corresponding a position along the directory-path identified by a wildcard. It will thus reconstruct, from that directory-path RA/ * / DM/SCS, among others, the URLS: http://www.site4A723.ch/RA/BD1/DM/SCS, http://www.site4A723.ch/RA/BD2/DM/SCS, http://www.site4A723.ch/RA/BD3/DM/SCS, etc.

For the human or machine operator intending to access all speed control servos drive of motors in roving apparatus operating on the site, the IP protocol does not generally accommodate for a wildcard "*" in the URL format. To take that into account, the network management advertises to all participants a convention whereby a certain designated character string, e.g. "WLDCRD", which is formally acceptable in the URL format, corresponds to a wildcard. The network communications manager for the worksite is programmed to identify that string "WLDCRD" at any location in the URL directory-path and interpret it as the logical wildcard "*", as opposed to a particular directory. It then acts accordingly by reconstructing specific URLs covering the designation of each and every node corresponding to the position of "WLDCRD" in the tree structure, and sending those URLS to address the corresponding different items of apparatus, as explained above. The same teachings are applicable mutatis mutandis to other types of wildcard, e.g. "?" for designating any character.

Figure 6:
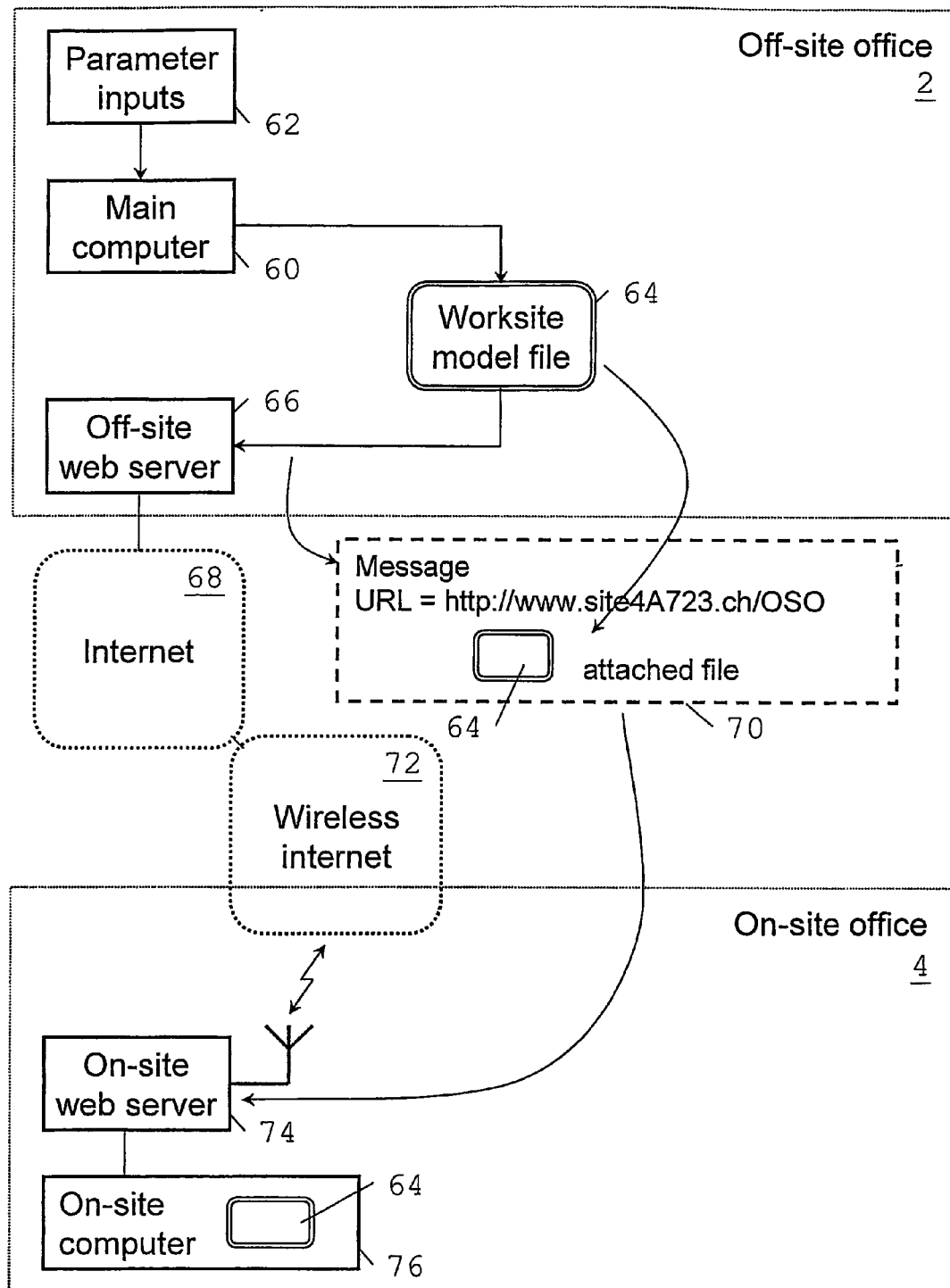
FIG. 6 is a simplified diagram showing how a worksite terrain model file is prepared and transferred to an on-site office for action, using IP messaging at a selected URL.

FIG. 6 shows how the IP platform is used for a transfer of information from the off-site office 2 to the on-site office 4. In the example, the information is a three-dimensional terrain model of the worksite to be achieved, as produced by the main computer 60 according to selected parameter inputs 62. The model is produced in the form of a computer data file 64 formatted to be readable by a computer at the on-site office 4. It is transferred internally to one or several distributed web server(s) 66 of the off-site office, connected to the Internet 68 through a telephone cable. The server encloses the model file in a standard IP format message 70 addressed to the on-site office, i.e. with the URL: "http:/www.site4A723.ch/OSO, and sends it through the Internet 68. The message 70 is distributed to the on-site office 4 via a wireless Internet 72 linked with the Internet.

Upon receipt, the message 70 is automatically processed by the on-site web server 74 of the on-site office 4, from which the work-site model file 64 is extracted and sent internally to the on-site computer 76. Advantageously, the server 74 is equipped with a firewall function.

The computer can thereby update its current model, e.g. to incorporate changes to original plans, or new scheduling prerogatives.

The model serves as a basis for establishing the work plan at different levels. The main task of the on-site office is to identify tasks to be performed in order to reproduce in reality the contour information expressed by the model.

The/each server 66 cooperates with a database (not shown) which stores all the information for generating the URLs. The database records the relationships between the standard IP address of each communications interface and the corresponding URL address form, so that it can access any communications interface by its recorded IP address in response to a received URL designating that communicating, as explained above.

The database also stores the information for converting a wildcard into a corresponding exhaustive list of named nodes of the directory path in which that wildcard is present, as explained above.

Figure 7:
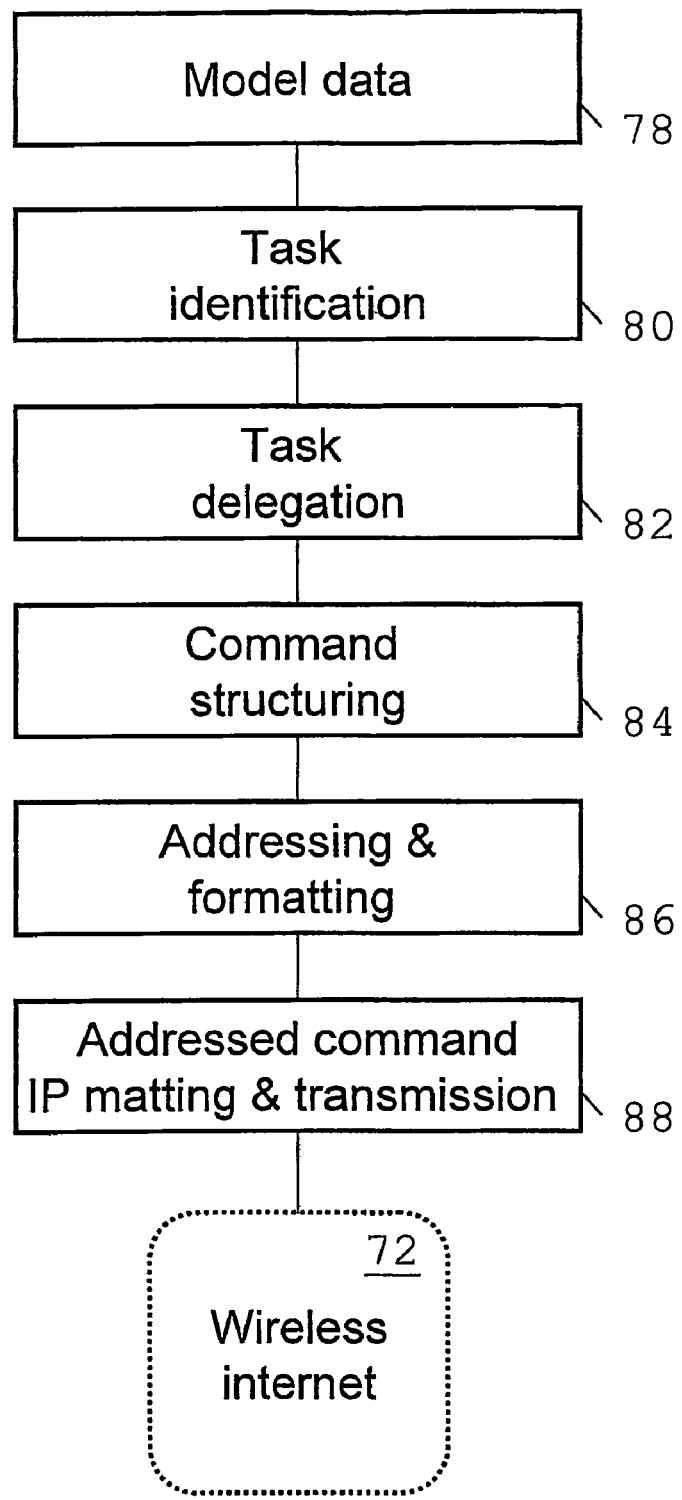
FIG. 7 is a diagram showing the steps performed by the on-site office in the allocation of specific commands to on-site communications interfaces in response to data extracted from the worksite terrain model file.

FIG. 7 illustrates the tasks in producing specific addressed commands from the model data 78 extracted from the model file 64. The data are analysed to determine general characteristics of the work to be carried out, e.g. quantities of earth to be moved per grid element, changes in level, order of work, etc.

From that high-level data, a task identification procedure 80 is activated, in which more specific tasks are identified, such as the number and type of mobile apparatus to bring into action, tools to be fitted etc. These tasks in turn each give rise to sub-tasks, e.g. commands to actuators, propulsion motors, etc.

The thus-identified tasks are then submitted to a task delegation procedure 82, in which they are attributed individually to the specific physical apparatus or groups of apparatus.

The delegation thus involves converting the delegated tasks into commands which will produce those tasks when executed. This involves command structuring 84, in which commands are adapted to a format intelligible by the apparatus to which it is intended.

Next, the structured commands are attributed the URL directory-path of the communications interface to which they are intended, through an addressing and formatting procedure 86. The latter thus generates the addressee's URL with the directory-path established in accordance with hierarchical structure as explained in the example of FIG. 5.

The commands to the addressee URL are entered as payload in an IP format message and sent to the wireless Internet 72 through an IP transmission procedure 88 using the web server.

It will be noted that the on-site office has total flexibility to address commands of different levels directly to the corresponding level of hierarchy of the communications interfaces, and can thereby determine the delegation of work essentially solely on efficiency criteria. In other words, its communication is not bound to a specific level of the hierarchy.

The wireless LAN used for conveying the IP messages over the worksite uses the main transmission mast 32, generally situated in proximity to the on-site office 18 (FIG. 2) for optimum communication conditions between the latter and both the off-site office and nearby communications interfaces in the worksite. However, a worksite may cover a large area, or extend over a long distance, e.g. in the case of road building. Moreover, the site may comprise tunnels, metallic structures, etc. which can attenuate radio transmissions.

To ensure optimum communication conditions even under those conditions, the preferred embodiment provides that some at least of the communications interfaces additionally serve as message relaying stations. These relaying stations are effectively organized as nodes or hubs in the wireless communication network, each receiving data packets and re-sending them to either the end destination or to another relaying further along the path.

Figure 8:
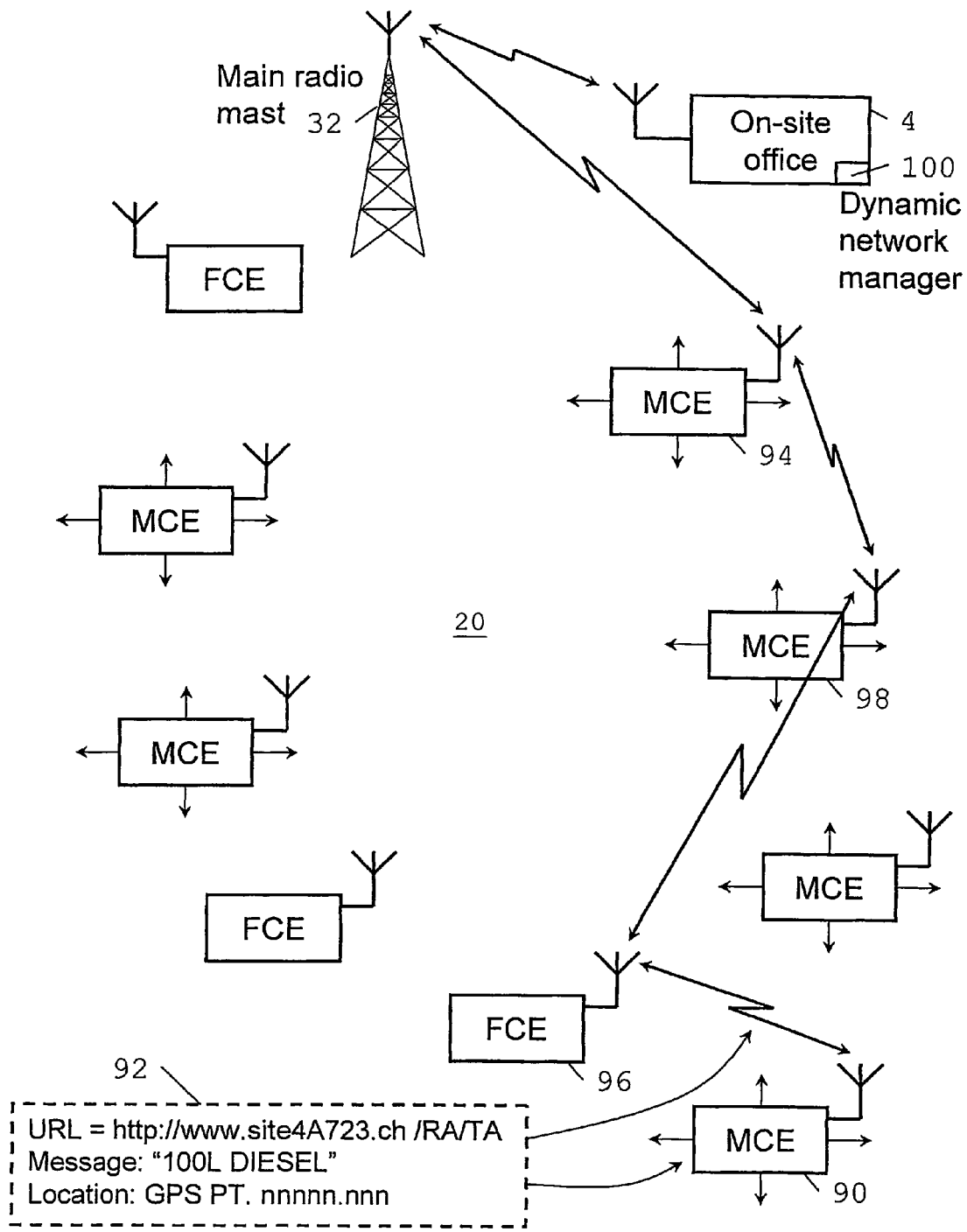
FIG. 8 is a diagram showing how IP messages are selectively relayed as a function of their URL format by intervening communications interfaces within the worksite, between an addressor and addressee.

FIG. 8 illustrates schematically the concept of using communications interfaces as relaying stations. In the example, the latter are constituted by:

fixed communications interfaces, designated FCE, such as ground-based sensor stations, TPS units 30, signaling towers 26, cement silos, fixed cranes, etc.; and mobile communications interfaces, designated MCE, such as mobile earth moving apparatus (bulldozers 24, tipper trucks, mechanical shovels, mobile terminals, etc).

Typically, the on-site office would have a large communication range, assisted by the main radio mast 32, covering all but the remotest or heavily shielded communications interfaces.

On the other hand, by virtue of their additional relaying roles, the communications interfaces themselves need not have a large range, so reducing power consumption and costs.

The operation of the messaging relaying network is illustrated by the following example. A Bulldozer 90 (ICE) needs to be refueled, as detected by its on-board sensors. Its onboard computer automatically prepares a standardized IP format message 92 requesting a fuel fill.

The request message 92 comprises three main fields:

the addressee, which is a tanker truck 94. Accordingly, the URL format shall include " . . . /RA/TA", where "TA" defines the sub-class of mobile apparatus RA attributed to tanker trucks;

the message content, set according a predetermined form intelligible by the tanker's on-onboard computer, indicating the requirement, e.g. "100L DIESEL" for 100 litres of Diesel oil, and the current location of the Bulldozer, in terms of GPS grid coordinate data, acquired through an on-board GPS receiver;

The message shall be prepared and sent from the IP server layer on board the Bulldozer through the wireless radio network.

If the tanker truck 94 is out of range for a direct radio link, it will nevertheless reach its destination by being relayed by one or more intervening communications interfaces on the site. In the example, the message is first detected and intercepted by a first intervening communications interface 96, which is of the fixed type. From there it is sent to a second communications interface 98, which is of the mobile type, and from the latter to the fuel tanker 94.

Upon receipt of the message 92, the tanker's on-board computer shall extract the message content and read the GPS coordinates to determine the location of its sender. With that information, it will be able to determine automatically a road path leading to the Bulldozer, and thereby effect the refueling.

It will be appreciated that the refueling task in the above example is handled entirely at a sub-level in the hierarchical structure, i.e. between communications interfaces consisting of two mobile apparatus (Bulldozer and tanker truck), without calling upon management resources at the next highest level of hierarchy, namely the on-site office. However, the site office can be informed for monitoring and scheduling purposes.

More generally, all tasks involving one level of sub-class or lower in the hierarchy (cf. FIG. 5) are handled directly at that level, without calling upon the resources of the a higher degree of sub-class.

This can be illustrated by the following additional example. The displacement speed of a truck has to be adjusted according to the ground and climatic conditions. The latter are determined locally by ground based sensors 28 which generically belong to a first level of communications interfaces in the hierarchy. Ground based sensors of the climatic type belong to a second level (generically covering temperature sensors, wind speed sensors, rain sensors, etc.), and the specific instance of sensors being able to detect potential icing conditions belongs to a third level in the hierarchy. A URL of an icing sensor bearing the identification number 28 may be for instance http://www. site4A723.ch/SEN/CLIM/

ICE28, where "SEN", "CLIM" and "ICE" are respectively used to identify the general ground-based sensor sub-class, the climatic sensor sub-class and the icing condition sub-class respectively. The icing sensor may be programmed to issue warning messages when the temperatures falls below a defined limit, e.g. 4° C., or critical combinations of low temperatures and wind speeds occur. The messages are specifically addressed only to communications interfaces concerned, including propulsion motor servo control units of any mobile apparatus within a certain range, as determined from their GPS coordinates.

In this way, if the propulsion motor is decentralized from the other parts of the mobile apparatus, so as to constitute its own communications interface with a URL, then the central command (next higher level of sub-class) of that mobile apparatus can simply ignore the not relevant message, so being relieved of data processing tasks. Indeed, the structure of the address indicates that the message is addressed specifically to the level of sub-class belonging to propulsion motors. The web server layer of the latter, forming part of its communications interface, shall extract the contents of that message and act accordingly, e.g. by alarming the driver through the MMI or even by directly reducing the drive speed. To do this, the communications interface of the propulsion unit passes on the message to the speed control servo, which is one level of hierarchy further down, as the latter does not possess its own web sever in this example. However, if the speed control servo does have a web server, the latter would be able to determine that it is the intended recipient of that message, by virtue of the hierarchical address format, and read its contents autonomously. In this case, the web server for the propulsion motor would not have to intervene either to receive and handle the message. In other words, the exchange of information would be performed entirely at the level of sub-class and—if so desired—locally informing higher level elements To obtain generic information, each communications interface can be programmed to access the URL corresponding to its directory-path truncated at different termination points along that path, and to seek messages at each truncation so as to obtain corresponding generic information. For instance, the device at URL: http://wwww.site4A723.ch/RA/DB3/DM/SCS can search for generic messages successively at URLs: http://wwww.site4A723.ch/RA/DB3/DM, http://wwww.site4A723.ch/RA/DB3, URL http://wwww.site4A723.ch/RA, URL http://wwww.site4A723.ch.

Generally, any level of sub-class can call, and be accessed by any other level, including the topmost level at the off-site office.

The embodiment provides for various security and safety measures in the communication between the entities, such as the known provision of firewalls. At a general level, it provides a secured access layer which restricts access to the communications to only the entities recognized as belonging to the worksite or having authorization to exchange data with on-site and off-site entities of the worksite and thus enables to decide who is able to use the communicating system. The secured access layer can be implemented using known techniques, examples of which are: creation of a virtual private network (VPN) which constitutes the network through which all entities communicate, data encryption, allocation of passwords, etc.

Such a measure thereby prevents accidental interferences with other outside communications that may be in the communication range of the site. It also prevents possible malevolent tampering.

An alternative known measure would be sealing off from the internet and creating a secure intranet with controlled access.

At another level, there can also be implemented security measures to limit communications between only those entities which are mutually compatible or expected to communicate. These measures can, for instance, prevent a ground-based sensor from sending data messages addressed to mobile unit that is not intended to process such data. To this end, a communications interface with restricted communication capability can be assigned a correspondingly restricted list of possible addressees it can call, that list omitting incompatible addressees. The hierarchical addressing structure can be used to advantage in this security measure, by defining the list in terms of classes/sub-classes of communications interfaces constituting authorized addressees.

While the communications interfaces are autonomous as regards the compiling and sending of messages to other communications interfaces, without having to pass through a centralized messaging center, the embodiment preferably provides for an overall monitoring the message traffic. The monitoring is typically conducted at the main on-site office, and serves a number of functions, including:
identifying occurrences of overloads and failures in the communications network,
determining an optimum network configuration according to traffic density, types of messages being sent at a given time,
analyzing communication trends and patterns, e.g. activity of communications interfaces according to their class, hierarchical level, etc. for evaluation, test and diagnostic purposes.

The results of the monitoring can be presented on screen using graphics interfaces, enabling personnel to visualize the dynamic network and data exchanges symbolically in real time.

Moreover, the URLs or equivalent can be managed by a central system. The latter has the function of allocating the different addresses to the respective communications interfaces, generating the above-mentioned restricted lists, updating addresses, generating new categories or sub-classes according to evolutions in the apparatus used in the worksite, etc.

The hierarchy of classes is defined and managed in a database either on site or off site. The URL directory-paths are stored electronically in the database, where they are electronically indexed with their corresponding class and hierarchical level, and the corresponding IP address of the corresponding communications interface. The database cooperates with each server operating for the worksite. If a new communications interface is added to the worksite, or if an existing item of apparatus is assigned to another communications interface, the database manager determines its new position in the classification hierarchy, electronically generates the corresponding directory-path, produces the entity's URL with that directory-path attached to the hostname as explained above, and advertises that URL to all the other communications interfaces on the network, e.g. by known flooding techniques.

The URL directory-paths and the corresponding hierarchy of classes/subclasses are organized and structured—from the point of view of the main system organization—at the level of the off-site or on-site office. Such an organization may not necessarily correspond to the point of view of another organization or managing agent required to address those entities. For instance, an outside contractor would prefer to establish the directory structure in terms of its own equipment operating on the site, or a maintenance firm may establish the hierarchy in accordance with the type of spare parts to provide, the frequency of interventions, etc. The logical definition and tree structure of the classes and subclasses would then be different from that used by the off-site or on-site office network communications manager.

To accommodate for this, the database for the network communications manager is adapted to store and operate with a number of different logical definitions and tree structures for the worksite entities being managed. Each logical definition and tree structure is mapped in a correspondence table indexed against the logical definition and tree structure used for establishing the URL directory-paths, so that any given entity called using a given logical definition and tree structure is automatically re-expressed in terms of the directory-path used for the URL by the network communications manager. Alternatively, it may be directly re-expressed in terms of the IP address of the corresponding communications interface.

Figure 9:
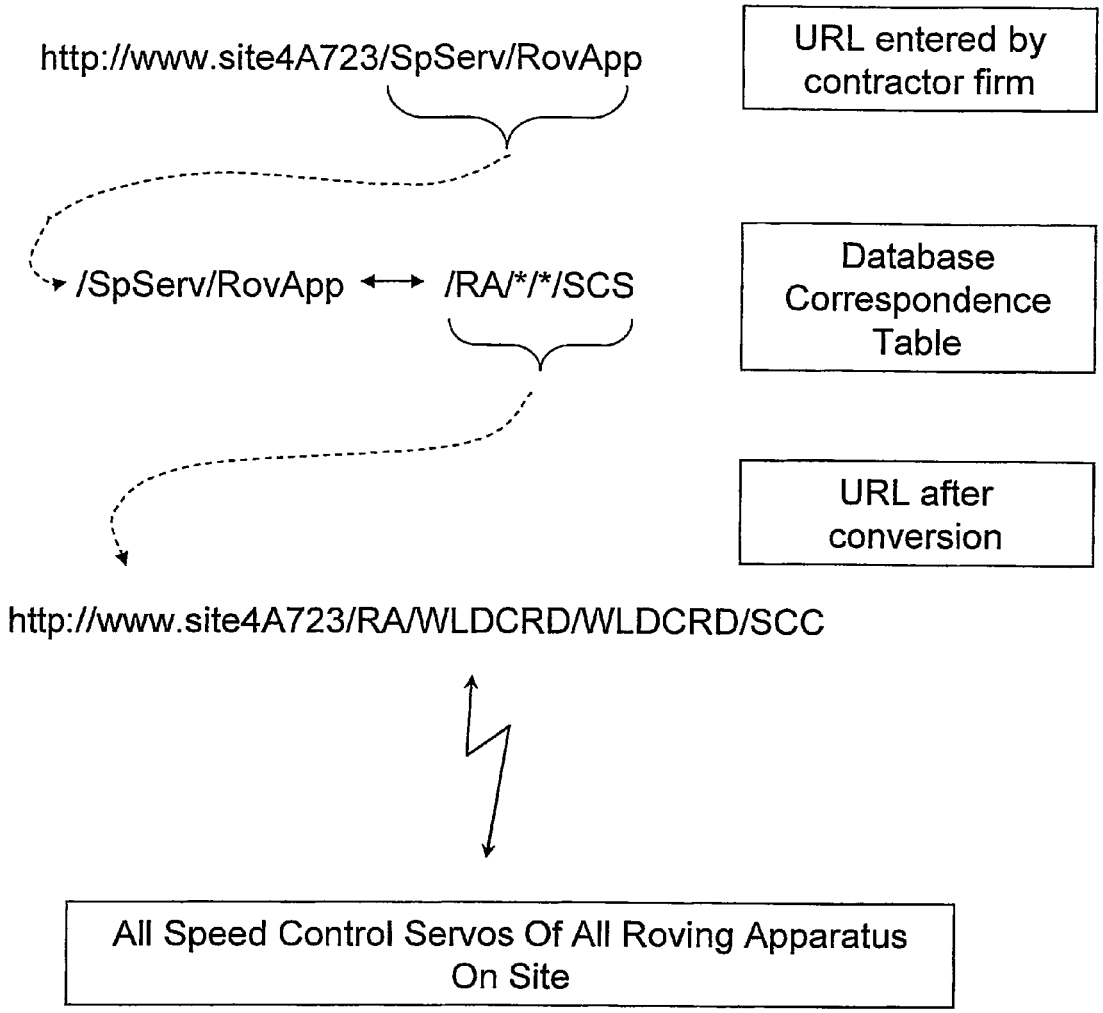
FIG. 9 is a diagram showing how a URL produced by a firm for identifying items apparatus according to its own (custom) directory-path is converted into a URL used by the worksite management for accessing those items of information.

FIG. 9 illustrates this principle with a simple example of a firm specializing in speed servo control mechanisms for different types of equipment operating on the site. This firm would naturally place speed servo mechanisms in its main directory. Subdirectories could include speed servo control mechanisms catalogued on the basis of the firm's own product lines, which may not necessarily all concern a worksite application, covering e.g. speed control servo mechanisms respectively for drilling equipment, road vehicles, ships, and roving apparatus for worksites. The firm uses its own logical definitions and naming scheme for these items and applications, including "SpServ" as the generic abbreviation for speed control servos and "RovApp" for roving apparatus. Accordingly, information and records in the firm's own database for roving apparatus speed control servos could have the following tree directory-path: SpServ/RovApp. If that firm needs to communicate with all the roving apparatus speed control servos it operates on the particular worksite with hostname "site4A723.ch", it can append its own directory-path to that hostname to produce the URL: http://www.site4A723.ch/SpServ/RovApp".

The database shall respond to that URL on the basis of the hostname. It then extracts the directory-path "/SpServ/RovApp" from that URL and automatically converts it into the directory-path "/RA/*/*/SCS" using a stored electronic correspondence table where "SCS" is identified to speed control servos in the network manager's own directory structure. The table can be in an electronic memory and prepared initially on the basis of information supplied by the firm in the question.

The converted directory-path, adapted in the form that is electronically exploitable by the on-site or off-site office apparatus, is then used as the URL directory-path to form the required URL: http://www.site4A723.ch/RA/WLDCRD/WLDCRD/SCS, where "WLDCRD" is established as corresponding to the symbol "*", as mentioned above. Before being used to address the different URLs for accessing the items of apparatus concerned, the network communications manager replaces the string "WLDCRD" with the exhaustive list of the members of the corresponding subclass in which figures that string, each giving rise to a specific URL that is sent on the network.

If the database needs to identify the source having sent the directory-path to be converted, e.g. if the names appearing in the directory-path (such as "SpServ" or "RovApp" do not in themselves reveal the origin of the access requester (e.g. the aforementioned firm), then the identification of the requester can be inserted directly at a prescribed portion of the URL.

It will be appreciated that the above-described hierarchical addressing format accommodates advantageously for so-called "fractal networks" or the like, in which the hierarchical ordering includes one or more sub-levels which themselves constitute a root for another dependent network.

For instance, an open cast mine may as a whole constitute the primary or source network, identified by a collective domain name as explained above. This primary network may be decomposed into a number of secondary networks, each having a root node at a first level down in the hierarchy from the root node of the primary network. The secondary networks can e.g. correspond respectively to: a mill operating in the area of the mine, a tunnel being excavated, a cluster of machines working at a given geographical location of the site, a dragline, etc. Each secondary network can, in turn, have a node which constitutes the root of a tertiary network, etc. The approach explained based on a directory-path address structure then makes it a simple matter to communicate with any chosen communications interface associated to a given item of apparatus, at any hierarchical levels of any of the fractal networks.

Advantageously, the relay points 96 and 98 (FIG. 8) are managed as in a cellular telephone network, whereby only intervening communications interfaces along the most direct path connecting the end communications interfaces 90 and 94 (FIG. 8) are activated. This can be achieved in a variety of ways, one of which is indicated with reference to FIGS. 10 and 11.

In the example, the overall communications managements task for establishing the network are attributed to a dynamic network manager 100 at the on-site office.

Of the mobile communications interfaces, those that constitute a relay station are equipped with a GPS receiver, or equivalent positioning device, able to produce coordinate reference data. All the relay stations, whether in the form of mobile or fixed communications interfaces, have a local network resource management layer. The latter contains updatable tables of the position coordinates of each of the relay stations, fixed or mobile, on the site.

At an initial phase, the dynamic network manager 100 records the GPS coordinates of all the fixed communications interfaces, as obtained e.g. from a manual input during a preparation phase. These data are loaded into the position coordinate tables of each relay station.

Figure 10:
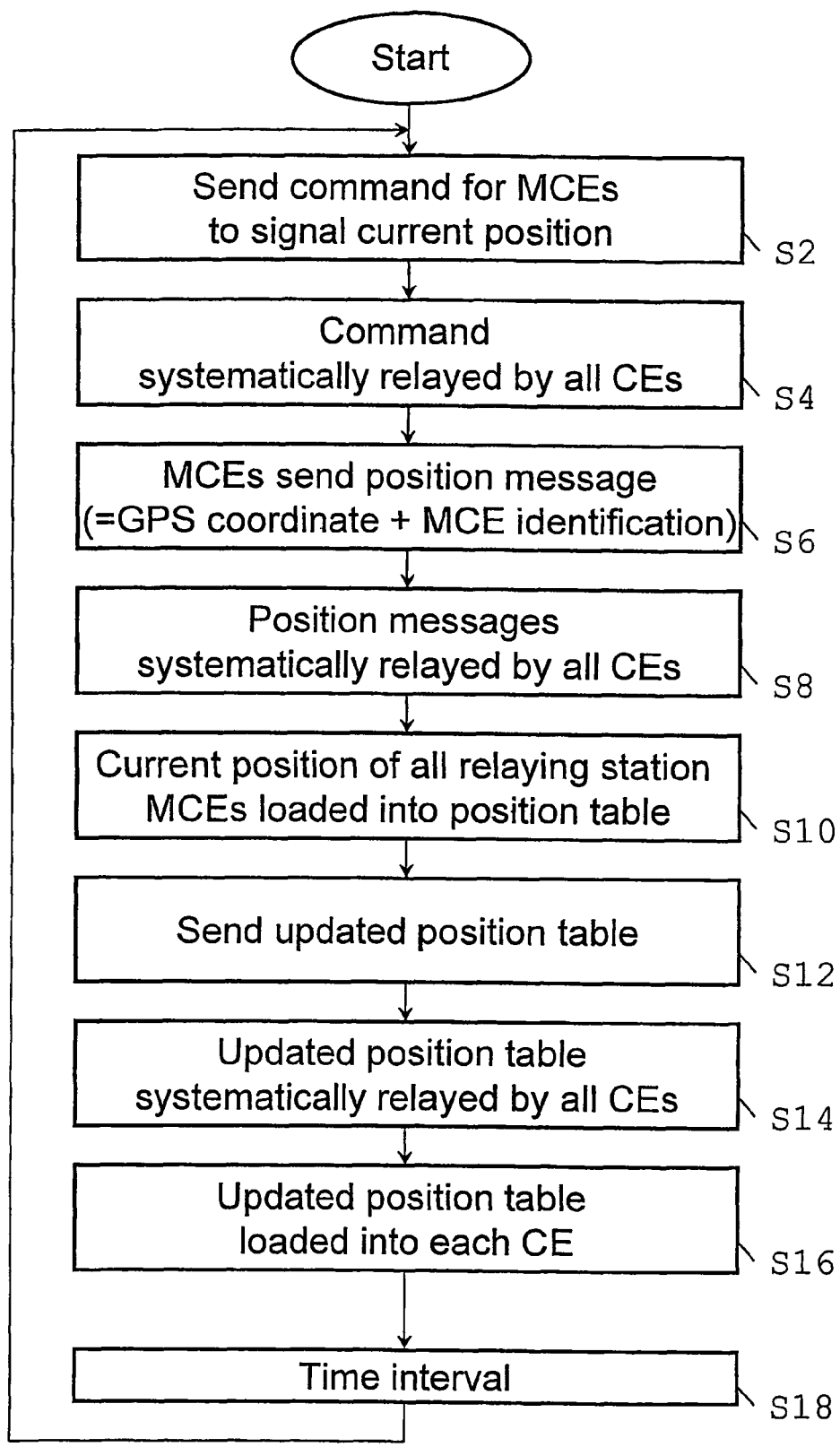
FIG. 10 is a flow chart showing the steps involved in creating an updated position table for each active communications interface of the worksite, according to one embodiment.

In order to determine the current position coordinates of the relay stations in the form of mobile communications interfaces, the dynamic network manager 100 performs at frequent intervals an interrogation routine, the main steps of which are shown in the flow chart of FIG. 10.

The routine begins with a command message sent from the main radio mast 32 requesting all mobile communications interfaces serving as a relay station to send their instantaneous GPS position coordinates (step S2). Each communications interface which receives this message is programmed to relay (i.e. resend) it systematically (step S4). In this way, it is ensured that the message reaches all the possible communications interfaces susceptible of forming the communications network.

Upon receipt of the command, each mobile communications interface sends a position message containing its GPS coordinates and its MCE identification. The latter can be its unique address.

Any communications interface which receives such a position message systematically relays it, so ensuring that the position message shall ultimately reach the dynamic network manager 100.

Once the dynamic network manager has thus acquired all the current positions of the mobile communications interfaces serving as relaying stations, it loads their corresponding coordinates into the position table (step S8). In this way, the latter is complete and up to date with the coordinate data of both the fixed and mobile communications interfaces serving as relaying stations.

The dynamic network manager then sends the updated position table through the main radio mast 32 (step S12), and the table is systematically relayed by all communications interfaces which receive it (step S16). At the same time, each communications interface loads the updated position table into its own local management layer upon receipt.

In this way, each communications interface acquires and stores the current position coordinates of all the other communications interfaces, whether fixed or mobile. The table will thus comprise two confronting lists, respectively containing the IP address and/or URL of each communicating unit and its corresponding GPS coordinate data.

The manager then counts a time interval of a few seconds (step S18) and loops back to the first step of the routine (step S2) to acquire the following updated current positions of the mobile communications interfaces.

Figure 11:
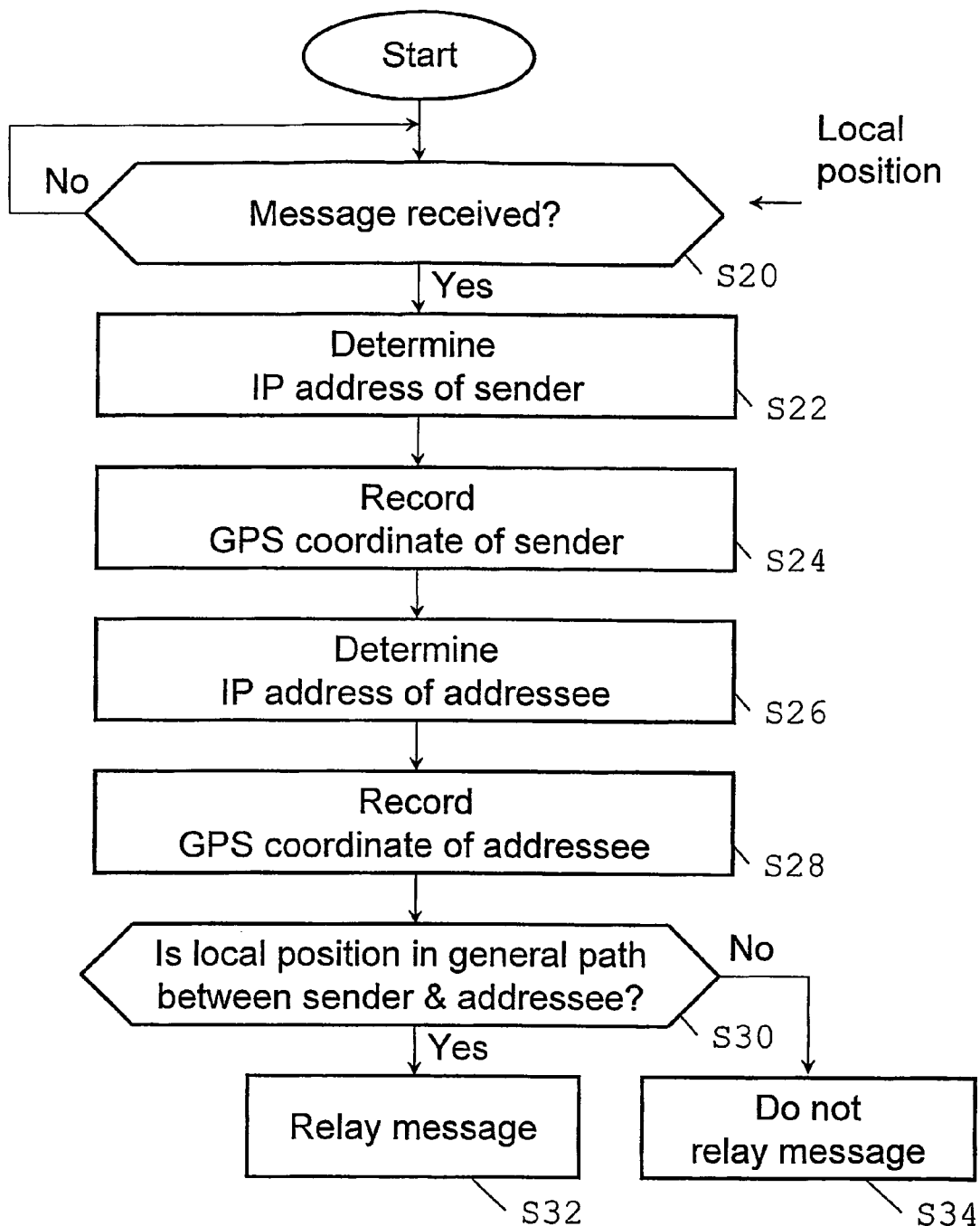
FIG. 11 is a flow chart showing how a communications interface determines whether or not to relay a message it has received.

FIG. 11 shows a simple algorithm by which any relaying station can determine whether or not it should relay a received message from another communicating station (outside the routine described above, in which relaying has to be executed systematically).

The algorithm is performed by each relaying station upon receipt of a message. The position of the relaying station in question is referred to as the "local position". The relaying station begins by waiting for a received message (step S20). Upon receipt of a message, it analyses its format and contents to determine the address of the sender (step S22), from which it notes its GPS coordinates using its updated table (step S24). Likewise, it determines from the message the address of the addressee (step S26), and notes the GPS coordinates of the latter using the same table (step S28).

Knowing the GPS coordinates of the sender and addressee on the one hand, and its local GPS position on the other, the relaying station can apply any suitable algorithm to determine whether or not its local position is in the general path between the sender and addressee (step S30). In a very simple case, the algorithm consist in determining whether the distance separating the local position and the addressee is less than the distance separating the sender and the addressee. In the affirmative, the message is relayed (step 32), given that it shall then be transmitted from a closer position to the addressee, and hence along a path to the latter. Otherwise, the message is not relayed (step S34), as the local position is in the general opposite direction of the path. It can therefore be expected that another relaying station shall be both within range of the original message and in the general path connecting the sender and addressee to ensure the relaying in its place.

The addresses of the sender and/or of the addressee (cf. steps S22 and S26) can be expressed in terms of URLs and/or IP addresses.

Other more complex algorithms can determine whether to relay or not on the basis of the current positions of other communications interfaces, signal strength evaluation, etc. using known techniques.

By using digital terrain models of the site and taking the characteristics of the used frequencies in to account, sophisticated algorithms are able to determine radio coverage dynamically as a function of the available fixed and mobile communication entities and thereby indicate areas of insufficient coverage. If required, these areas may then be covered by sending an auxiliary vehicle with its on-board MCE to a suited location taking advantage of the GPS navigation system of said vehicle and thereby granting the necessary radio coverage for operation of mobile units as Bulldozers etc.

The advantage of the selective relaying in the preferred embodiment is that it avoids useless retransmissions of messages, and thus reduces the traffic on the network and occupation of management resources.

It will be understood from the foregoing that the embodiments can play an important role in lining reality to spatial models for the automation of worksites, such as automated mines and large civil engineering projects.

It judiciously utilizes and takes advantages of new techniques in real-time systems, 3-dimensional site modeling, transparency of use (seamless communication across levels of hierarchy), multi-sensor integration, new data communications systems, and web-based information and data exchange via client-server and peer-to-peer methods.

The embodiment described is based on the approach where each—or at least a substantial proportion—of the apparatus involved form part of a network that is connected via wireless communications and utilizes the power of the Internet. By so doing, data from any apparatus in off site or on the worksite can be made available to any other device within the network.

This allows design data constructed and stored in an office system to be directly accessed by techniques such as TPS, GPS or MA devices on the worksite. Conversely, observed data within the worksite can be directly accessed by the office, whether that be an apparatus, part of the apparatus (communications interface), site, branch or main office.

Also, the data on each communications interface within the worksite can be accessed by any other communications interface within the worksite or even from another worksite or location. By using the Internet or equivalent message communication systems, each communications interface effectively becomes a web server.

Applications are numerous. For instance, the teachings can be used for exchanging industrial information in the construction and surveying sector. The information can relate to device and vehicle operating parameters such as: system diagnostics and error alerts, engine performance, tyre pressure, machine status, etc. In monitoring applications, the items of apparatus thus able to exchange data may include strain gauges, accelerometers, and temperature, pressure and humidity sensors.

The ability to interconnect a variety of sensors and make that information available via a networked site provides substantial productivity improvements. Planning, project management, vehicle and device management are examples of applications which can use the present teachings to exchange the data among items of corresponding apparatus to advantage.

The present teachings can also be used to remotely update device firmware/software among the networked items of apparatus, e.g. for bug fixes or new features or enhancements, so providing substantial savings in logistics for the user.

The present teachings can also be used for remote device diagnostics where related data are exchanged selectively between the networked items of apparatus to enable service engineers to evaluate device performance while it is still resident in the field. They can also be used in telemetry, notably wireless telemetry.

The above teachings are amenable to other protocols than the IP protocol, and to other network techniques. In particular, the site can be organized and run according to a local area network (LAN) in which the communications interfaces communicate with each other by remote accessing.

In one embodiment, the invention provides a method of/system for managing operations in an outdoor worksite through exchanges of data between items of apparatus operating on the site, the operations being initiated from a work plan, and assigned to the items of apparatus organised in at least one level of subclass with respect to the level of the work plan, wherein the exchanges of data are effected over a communications network operative on the worksites, each item of apparatus being allocated to a specific communicating entity through which it can access the network, the method/system further comprising the step of/means for providing each communicating entity with an address conforming to a standardised protocol which allows direct exchanges over the network substantially seamlessly between addressee and addressor communicating entities, independently of their respective levels of subclass.

The invention claimed is:

1. A method of managing information exchanges in an outdoor worksite with an office on said outdoor worksite, said outdoor worksite comprising any one of a civil engineering worksite, a landscaping worksite, a road or rail link construction worksite or a mining worksite, by networked items of apparatus which perform tasks in connection with said outdoor worksite and which receive and/or send data, the method using an electronic data network comprising management means cooperating with a plurality of communications interfaces, a given said networked item of apparatus having a data link with a specified communications interface, said networked items of apparatus comprise networked mobile items of apparatus and networked fixed items of apparatus, each networked mobile item of apparatus and networked fixed item of apparatus being capable of communication with any other networked mobile and fixed item of apparatus within communication range of its communications interface, wherein all said networked items of apparatus are organized in a plurality of hierarchical levels according to a determined dependency relationship of the outdoor worksite, and in that said management means which includes a processor and memory and performs the method comprising the following acts:

storing a correspondence between each said networked item of apparatus and an address structure reflecting the hierarchical position of that networked item of apparatus in said determined dependency relationship of the civil engineering, landscaping, road or rail link construction, or mining worksite in a database, the networked items of apparatus including the mobile items and fixed items of apparatus;

operating by converting a first address structure reflecting the hierarchical position of a selected earth moving mobile networked item of apparatus into a corresponding first device address for accessing said selected earth moving mobile networked item of apparatus on said electronic data network;

using that first device address to establish a communications link with said selected earth moving mobile networked item of apparatus, via its communications interface, in response to a first call for position coordinates addressed with an address structure reflecting the hierarchical position of said selected earth moving mobile networked item of apparatus;

operating by converting a second address structure reflecting the hierarchical position of a selected fixed networked item of apparatus into a corresponding second device address for accessing said selected fixed networked item of apparatus on said electronic data network;

using that second device address to establish a communications link with said fixed networked item of apparatus, via its communications interface, in response to a second call for position coordinates addressed with an address structure reflecting the hierarchical position of said selected fixed item of apparatus;

wherein said address structure reflecting the hierarchical position of fixed or mobile items of apparatus includes a Uniform Resource Locator (URL), said URL having a directory-path portion corresponding to said address structure reflecting the hierarchical position of said fixed or mobile selected item of apparatus;

assigning a separate class/sub-class, in said hierarchical position, to items of apparatus as a function of whether they are fixed or mobile on the worksite; and wherein hierarchical positions of fixed or mobile items of networked apparatus are dynamically changeable based on the progress of the worksite, addition of one or more new items of apparatus to the worksite, and reassignment of one or more items of apparatus on the worksite.

2. A method according to claim 1, wherein said address structure is an IP (Internet Protocol) address.

3. A method according to claim 1, wherein said address structure reflecting the hierarchical position of said selected mobile or fixed item of apparatus is expressed as a directory-path.

4. A method according to claim 1, wherein said worksite is identified by a generic portion of a said address structure that comprises said address structure reflecting the hierarchical position of a selected item of apparatus.

5. A method according to claim 1, wherein said uniform resource locator includes a hostname portion that is specific to said worksite.

6. A method according to claim 1, further comprising an act of converting an address structure designating an item of apparatus to be accessed in accordance with a second hierarchy, the second hierarchy being different from the hierarchy used by the management means to organize the hierarchical levels according to said determined dependency relationship, into the address in said electronic network of said designated item of apparatus.

7. A method according to claim 1, wherein at least some items of mobile apparatus perform the act of relaying messages over said electronic network.

8. A method according to claim 1, further comprising an act of determining a current position of items of mobile apparatus and the act of managing the distribution of messages within said electronic network according to the items' current position.

9. A method according to claim 1, wherein a first level of class/sub-class of item of apparatus, in said hierarchical position, comprises mobile units, a second level of sub-class being at least one command responsive functionally within said mobile units.

10. A method according to claim 1, further comprising an act of securing communications by providing technical means for restricting access to the network to only authorized communications interfaces.

11. A method according to claim 1, further comprising an act of limiting data transmissions to between only items of apparatus which are mutually compatible or expected to communicate with each other over said electronic network.

12. A method according to claim 11, further comprising the act of providing a centralized monitoring and/or management of messages exchanged over said electronic network.

13. A method according to claim 1, further comprising an act of providing a centralized management of fixed or dynamic identification allocation to the communications interfaces operating in the network.

14. A method according to claim 1, further comprising an act of executing automatically a work plan programming said tasks of said items of apparatus automatically to conduct operations in said worksite, commands of said work plan designating selectively to said items of apparatus using said address structure reflecting the hierarchical position of said selected item(s) of apparatus.

15. A method according to claim 1, wherein said mobile or fixed items of apparatus communicate to each other selectively, a call being made from one item of apparatus to another using said address structure reflecting the hierarchical position of said selected item of apparatus.

16. A method according to claim 1 for managing an automated worksite further comprising an act of sending commands to a contour changing apparatus and to an on-board apparatus through a defined protocol, the commands being elaborated from a predetermined model.

17. A method according to claim 1 for managing an automated worksite in which physical and logical addressing of the communication interfaces is separated with a unique ID other than the IP address.

18. A method according to claim 17, wherein the physical and logical addressing includes multiple different IP and/or unique ID addressing.

19. A system for managing information exchanges in an outdoor worksite with an office on said outdoor worksite, said outdoor worksite comprising any one of a civil engineering worksite, a landscaping worksite, a road or rail link construction worksite or a mining worksite, the networked items of apparatus including mobile and fixed items of apparatus comprising:
an electronic communications network connecting items of apparatus which perform tasks in connection with said outdoor worksite and which receive and/or send data, the items of apparatus comprise the mobile items of apparatus and fixed items of apparatus, the electronic communications network comprising:
management means cooperating with a plurality of communications interfaces, a given said item of apparatus having a data link with a specified said communications interface, wherein all said networked items of apparatus are organized in a plurality of hierarchical levels according to a determined dependency relationship of the outdoor worksite, each networked item of apparatus being capable of communication with any other networked item of apparatus within communication range of its communications interface, said management means comprising:
means for storing a correspondence between both a selected earth moving mobile item of apparatus and a selected fixed item of apparatus and an address structure reflecting the hierarchical position of those items of apparatus in said determined dependency relationship of the outdoor worksite in a database;
means for operating by converting said address structures reflecting the hierarchical positions of the selected items of apparatus into corresponding device addresses for accessing said selected items of apparatus on said electronic network; and
means operating on the basis of said device addresses to establish communications links with the selected items of apparatus, via their communications interfaces, in response to a call for position coordinates addressed with an address structure reflecting the hierarchical position of said selected items of apparatus, wherein:
the address structure reflecting the hierarchical position of fixed or mobile items of apparatus is a Uniform Resource Locator (URL), the URL having a directory-path portion corresponding to said address structure reflecting the hierarchical position of said fixed or mobile selected item of apparatus; and
hierarchical positions of fixed or mobile items of networked apparatus are dynamically changeable based on the progress of the worksite, addition of one or more new items of apparatus to the worksite, and reassignment of one or more items of apparatus on the worksite.

20. A system according to claim 19, wherein the device address includes an IP (Internet Protocol) address.

21. A system according to claim 19, wherein said address structure reflecting the hierarchical position of said selected item of apparatus is expressed as a directory-path.

22. A system according to claim 19, wherein said worksite is identified by a generic portion of a said address structure that comprises said address structure reflecting the hierarchical position of a selected item of apparatus.

23. A system according to claim 19, wherein said URL includes a hostname portion that is specific to said worksite.

24. A method of managing information exchanges in an outdoor worksite with an office on said outdoor worksite, said outdoor worksite comprising any one of a civil engineering worksite, a landscaping worksite, a road or rail link construction worksite or a mining worksite, by networked items of apparatus which perform tasks in connection with said outdoor worksite and which receive and/or send data, the method using an electronic data network comprising management means cooperating with a plurality of communications interfaces, a given said networked item of apparatus having a data link with a specified communications interface, said networked items of apparatus comprise mobile items and fixed items, wherein all said networked items of apparatus are organized in a plurality of hierarchical levels according to a determined dependency relationship of the outdoor worksite, and in that said management means which includes a processor and memory and performs the method comprising the following acts:
storing a correspondence between each said networked item of apparatus and an address structure reflecting the hierarchical position of that networked item of apparatus in said determined dependency relationship of the civil engineering, landscaping, road or rail link construction, or mining worksite in a database, the networked items of apparatus including the mobile items and fixed items of apparatus, wherein said address structure reflecting the hierarchical position of fixed or mobile items of apparatus includes a Uniform Resource Locator (URL), said URL having a directory-path portion corresponding to said address structure reflecting the hierarchical position of said fixed or mobile selected item of apparatus;
operating by converting said address structure reflecting a first hierarchical position of a selected networked item of apparatus into a corresponding device address for accessing said selected networked item of apparatus on said electronic data network;
using that device address to establish a communications link with said selected networked item of apparatus, via its communications interface, in response to a call addressed with an address structure reflecting the hierarchical position of said selected networked item of apparatus; and converting an address structure designating an item of apparatus to be accessed in accordance with a second hierarchy, the second hierarchy being different from the hierarchy used by the management means to organize the hierarchical levels according to said determined dependency relationship, into the address in said electronic network of said designated item of apparatus, wherein the second hierarchy defines a type of networked item of worksite apparatus, wherein the first and second hierarchies are dynamically changeable based on the progress of the worksite, addition of one or more new items of apparatus to the worksite, and reassignment of one or more items of apparatus on the worksite.

25. A method according to claim 24, wherein the first hierarchical position defines whether the selected networked item of apparatus is a fixed or mobile apparatus and the second hierarchy defines the type of mobile or fixed apparatus.

26. A method according to claim 25, wherein the second hierarchy includes definition of a bulldozer or mechanical shovel as the type of mobile apparatus.

27. A method according to claim 24, further comprising converting an address structure designating an item of apparatus to be accessed in accordance with a third hierarchy, the third hierarchy being different from the first and second hierarchies.

28. A method according to claim 27, wherein the third hierarchical position defines different groups of devices under central command of the device belonging to the second hierarchy.

29. A method of managing information exchanges in an outdoor worksite with an office on said outdoor worksite, said outdoor worksite comprising any one of a civil engineering worksite, a landscaping worksite, a road or rail link construction worksite or a mining worksite, by networked items of apparatus which perform tasks in connection with said outdoor worksite and which receive and/or send data, the method using an electronic data network comprising management means cooperating with a plurality of communications interfaces, a given said networked item of apparatus having a data link with a specified communications interface, said networked items of apparatus comprise mobile items and fixed items, wherein all said networked items of apparatus are organized in a plurality hierarchical levels according to a determined dependency relationship of the outdoor worksite, and in that said management means which includes a processor and memory and performs the method comprising the following acts:

storing a correspondence between each said networked item of apparatus and an address structure reflecting the hierarchical position of that networked item of apparatus in said determined dependency relationship of the civil engineering, landscaping, road or rail link construction, or mining worksite in a database, the networked items of apparatus including the mobile items and fixed items of apparatus;

operating by converting said address structure reflecting the hierarchical position of a selected networked item of apparatus into a corresponding device address for accessing said selected networked item of apparatus on said electronic data network, wherein said address structure reflecting the hierarchical position of fixed or mobile items of apparatus includes a Uniform Resource Locator (URL), said URL having a directory-path portion corresponding to said address structure reflecting the hierarchical position of said fixed or mobile selected item of apparatus;

using that device address to establish a communications link with said selected networked item of apparatus, via its communications interface, in response to a call for position coordinates addressed with an address structure reflecting the hierarchical position of said selected networked item of apparatus, wherein the hierarchical position of the selected networked item of apparatus is dynamically changeable based on the progress of the worksite, addition of one or more new items of apparatus to the worksite, and reassignment of the selected networked item of apparatus on the worksite;

receiving a position message from the selected networked item of apparatus the position message containing the coordinates of the selected networked item of apparatus and its identification information; and updating a position table with the coordinates of the selected networked item of apparatus.

30. A method according to claim 29, further comprising transmitting the position table containing current position coordinates of all communication interfaces at the worksite to at least selected networked item of apparatus as well as other networked items of apparatus within communication range of the management means.

31. A method of managing information exchanges in an outdoor worksite with an office on said outdoor worksite, said outdoor worksite comprising any one of a civil engineering worksite, a landscaping worksite, a road or rail link construction worksite or a mining worksite, by networked items of apparatus which perform tasks in connection with said outdoor worksite and which receive and/or send data, the method using an electronic data network comprising management means cooperating with a plurality of communications interfaces, a given said networked item of apparatus having a data link with a specified communications interface, said networked items of apparatus comprise mobile items of apparatus and fixed items of apparatus, wherein all said networked items of apparatus are organized in a plurality of hierarchical levels according to a determined dependency relationship of the outdoor worksite, and in that said management means which includes a processor and memory and performs the method comprising the following acts:

storing a correspondence between each said networked item of apparatus and an address structure reflecting the hierarchical position of that networked item of apparatus in said determined dependency relationship of the civil engineering, landscaping, road or rail link construction, or mining worksite in a database, the networked items of apparatus including the mobile items and fixed items of apparatus, wherein said address structure reflecting the hierarchical position of fixed or mobile items of apparatus includes a Uniform Resource Locator (URL), said URL having a directory-path portion corresponding to said address structure reflecting the hierarchical position of said fixed or mobile selected item of apparatus;

operating by converting said address structure reflecting the hierarchical position of a selected networked item of apparatus into a corresponding device address for accessing said selected networked item of apparatus on said electronic data network, the device address including data identifying a context of the selected networked item of apparatus such that the selected networked item of apparatus is ascertainable from other networked items of apparatus on the worksite from the device address alone; and using that device address to establish a communications link with said selected networked item of apparatus, via its communications interface, in response to a call addressed with an address structure reflecting the hierarchical position of said selected networked item of apparatus, wherein the hierarchical position of the selected networked item of apparatus is dynamically changeable based on the progress of the worksite, addition of one or more new items of apparatus to the worksite, and reassignment of the selected networked item of apparatus on the worksite.

32. A method according to claim 31, further comprising receiving and storing positional coordinates from the mobile and fixed items of apparatus.

33. A method according to claim 32, further comprising relaying the stored positional coordinates to the mobile and fixed items of apparatus.

34. A method according to claim 31, wherein the hierarchical position defines whether the selected networked item of apparatus is a fixed or mobile apparatus and the type of networked item of apparatus.

* * * * *